United States Patent
Levi et al.

(10) Patent No.: US 12,373,552 B2
(45) Date of Patent: *Jul. 29, 2025

(54) APPARATUS, METHOD AND ARTICLE TO FACILITATE AUTOMATIC DETECTION AND REMOVAL OF FRAUDULENT USER INFORMATION IN A NETWORK ENVIRONMENT

(71) Applicant: PLENTYOFFISH MEDIA ULC, Vancouver (CA)

(72) Inventors: Thomas Levi, Vancouver (CA); Steve Oldridge, Vancouver (CA)

(73) Assignee: PLENTYOFFISH MEDIA ULC, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/622,553

(22) Filed: Mar. 29, 2024

(65) Prior Publication Data

US 2024/0333807 A1 Oct. 3, 2024

Related U.S. Application Data

(60) Continuation of application No. 18/069,866, filed on Dec. 21, 2022, now Pat. No. 11,949,747, which is a
(Continued)

(51) Int. Cl.
*G06F 21/55* (2013.01)
*G06F 21/57* (2013.01)

(52) U.S. Cl.
CPC .......... *G06F 21/552* (2013.01); *G06F 21/577* (2013.01)

(58) Field of Classification Search
CPC .............................. G06F 21/552; G06F 21/577
See application file for complete search history.

(56) References Cited

U.S. PATENT DOCUMENTS

| 5,583,763 A | 12/1996 | Atcheson et al. |
| 5,724,521 A | 3/1998 | Dedrick |

(Continued)

FOREIGN PATENT DOCUMENTS

| WO | WO-2006094228 A2 * | 9/2006 | ............. G06F 21/55 |
| WO | 2008/030670 A1 | 3/2018 | |

OTHER PUBLICATIONS

Soumya Purohit · Roshan Neupane · Naga Ramya Bhamidipati · Varsha Vakkavanthula · Songjie Wang · Matthew Rockey · Prasad Calyam; Cyber Threat Intelligence Sharing for Co-Operative Defense in Multi-Domain Entities; IEEE Transactions on Dependable and Secure Computing; (Year: 2022).*

(Continued)

*Primary Examiner* — Kari L Schmidt
*Assistant Examiner* — Chao Wang
(74) *Attorney, Agent, or Firm* — Seed IP Law Group LLP

(57) ABSTRACT

A fraud detection system obtains a number of known fraudulent end-user profiles and/or otherwise undesirable end-user profiles. Using statistical analysis techniques that include clustering the end-user profiles by attributes and attribute values and/or combinations of attributes and attribute values, the fraud detection system identifies on a continuous, periodic, or aperiodic basis those attribute values and/or attribute value combinations that appear in fraudulent or otherwise undesirable end-user profiles. Using this data, the fraud detection system generates one or more queries to identify those end-user profiles having attribute values or combinations of attribute values that likely indicate a fraudulent or otherwise undesirable end-user profile. The fraud detection system runs these queries against incoming registrations to identify and screen fraudulent end-user profiles from entering the system and also runs these queries against stored end-user profile databases to identify and (Continued)

remove fraudulent or otherwise undesirable end-user profiles from the end-user database.

18 Claims, 9 Drawing Sheets

Related U.S. Application Data continuation of application No. 16/833,427, filed on Mar. 27, 2020, now Pat. No. 11,546,433, which is a continuation of application No. 15/782,576, filed on Oct. 12, 2017, now Pat. No. 10,637,959, which is a division of application No. 14/561,004, filed on Dec. 4, 2014, now Pat. No. 9,870,465.

(60) Provisional application No. 61/911,908, filed on Dec. 4, 2013.

(56) References Cited

U.S. PATENT DOCUMENTS

| | | | |
|---|---|---|---|
| 5,749,091 A | 5/1998 | Ishida et al. |
| 5,812,992 A | 9/1998 | de Vries |
| 5,963,951 A | 10/1999 | Collins |
| 6,006,225 A | 12/1999 | Bowman et al. |
| 6,018,738 A | 1/2000 | Breese et al. |
| 6,029,195 A | 2/2000 | Herz |
| 6,038,295 A | 3/2000 | Mattes |
| 6,041,311 A | 3/2000 | Chislenko et al. |
| 6,049,777 A | 4/2000 | Sheena et al. |
| 6,058,367 A | 5/2000 | Sutcliffe et al. |
| 6,061,681 A | 5/2000 | Collins |
| 6,064,980 A | 5/2000 | Jacobi et al. |
| 6,134,532 A | 10/2000 | Lazarus et al. |
| 6,169,986 B1 | 1/2001 | Bowman et al. |
| 6,199,067 B1 | 3/2001 | Geller |
| 6,266,649 B1 | 7/2001 | Linden et al. |
| 6,356,879 B2 | 3/2002 | Aggerwal et al. |
| 6,542,749 B2 | 4/2003 | Tanaka et al. |
| 6,681,232 B1 | 1/2004 | Sistanizadeh et al. |
| 6,735,568 B1 | 5/2004 | Buckwalter et al. |
| 6,772,150 B1 | 8/2004 | Whitman et al. |
| 6,782,370 B1 | 8/2004 | Stack |
| 6,783,065 B2 | 8/2004 | Spitz et al. |
| 6,853,982 B2 | 2/2005 | Smith et al. |
| 6,912,505 B2 | 6/2005 | Linden et al. |
| 7,113,917 B2 | 9/2006 | Jacobi et al. |
| 7,240,353 B2 | 7/2007 | Lau et al. |
| 7,313,536 B2 | 12/2007 | Westphal |
| 7,324,998 B2 | 1/2008 | Beres et al. |
| 7,562,814 B1 | 7/2009 | Shao et al. |
| 7,617,164 B2 | 11/2009 | Burges et al. |
| 7,873,695 B2 | 1/2011 | Clegg et al. |
| 8,122,142 B1 | 2/2012 | Svendsen et al. |
| 8,180,765 B2 | 5/2012 | Nicolov |
| 8,225,413 B1 | 7/2012 | De et al. |
| 8,499,247 B2 | 7/2013 | Niyogi et al. |
| 8,566,938 B1 | 10/2013 | Prakash et al. |
| 8,577,874 B2 | 11/2013 | Svendsen et al. |
| 8,620,790 B2 | 12/2013 | Priebatsch |
| 8,626,663 B2 | 1/2014 | Nightengale et al. |
| 8,712,943 B1 | 4/2014 | Kim |
| 8,745,083 B1 | 6/2014 | Ruiz |
| 8,775,284 B1 | 7/2014 | Crook et al. |
| 8,825,802 B2 | 9/2014 | Pearce |
| 8,856,922 B2 | 10/2014 | Rubinstein et al. |
| 8,930,398 B1 | 1/2015 | Kishore et al. |
| 8,943,047 B1 | 1/2015 | Carpio et al. |
| 9,047,611 B2 | 6/2015 | Krishnamoorthy et al. |
| 9,069,945 B2 | 6/2015 | Singh |
| 9,076,125 B2 | 7/2015 | Manolescu et al. |
| 9,160,742 B1 | 10/2015 | Ackerman et al. |
| 9,218,468 B1 | 12/2015 | Rappaport |
| 9,219,704 B2 | 12/2015 | Hamlin et al. |
| 9,536,221 B2 | 1/2017 | Frind |
| 9,537,706 B2 | 1/2017 | Frind et al. |
| 9,537,814 B2 | 1/2017 | Rubinstein et al. |
| 9,672,289 B1 | 6/2017 | Frind et al. |
| 9,679,259 B1 | 6/2017 | Frind et al. |
| 9,733,811 B2 | 8/2017 | Rad et al. |
| 9,830,669 B1 | 11/2017 | Frind |
| 9,836,533 B1 | 12/2017 | Levi et al. |
| 9,870,465 B1 | 1/2018 | Levi et al. |
| 10,108,968 B1 | 10/2018 | Tekle et al. |
| 11,908,001 B2 | 2/2024 | Frind et al. |
| 2002/0091972 A1 | 7/2002 | Harris et al. |
| 2002/0095303 A1 | 7/2002 | Asayama et al. |
| 2002/0103625 A1 | 8/2002 | Card et al. |
| 2002/0156632 A1 | 10/2002 | Haynes et al. |
| 2002/0184080 A1 | 12/2002 | Murad et al. |
| 2003/0014491 A1 | 1/2003 | Horvitz et al. |
| 2003/0065632 A1 | 4/2003 | Hubey |
| 2003/0065635 A1 | 4/2003 | Sahami et al. |
| 2003/0093405 A1 | 5/2003 | Mayer |
| 2003/0176931 A1 | 9/2003 | Pednault et al. |
| 2003/0177110 A1 | 9/2003 | Okamoto et al. |
| 2003/0234519 A1 | 12/2003 | Farmer |
| 2004/0012638 A1 | 1/2004 | Donnelli et al. |
| 2004/0107283 A1 | 6/2004 | Paddon |
| 2004/0210640 A1 | 10/2004 | Chadwick et al. |
| 2004/0230527 A1 | 11/2004 | Hansen et al. |
| 2004/0260781 A1 | 12/2004 | Shostack et al. |
| 2005/0003799 A1 | 1/2005 | Kang |
| 2005/0027707 A1 | 2/2005 | Syed |
| 2005/0080857 A1 | 4/2005 | Kirsch et al. |
| 2005/0108227 A1 | 5/2005 | Russell-Falla et al. |
| 2005/0108344 A1 | 5/2005 | Tafoya et al. |
| 2005/0223020 A1 | 10/2005 | Cutlip et al. |
| 2005/0240608 A1 | 10/2005 | Jones et al. |
| 2006/0018522 A1 | 1/2006 | Sunzeri et al. |
| 2006/0059142 A1 | 3/2006 | Zvinyatskovsky et al. |
| 2006/0059159 A1 | 3/2006 | Truong et al. |
| 2006/0149766 A1 | 7/2006 | Ghoting et al. |
| 2006/0206574 A1 | 9/2006 | Bellegarda et al. |
| 2006/0251339 A1 | 11/2006 | Gokturk et al. |
| 2006/0256959 A1 | 11/2006 | Hymes |
| 2007/0005587 A1 | 1/2007 | Johnson et al. |
| 2007/0061334 A1 | 3/2007 | Ramer et al. |
| 2007/0106659 A1 | 5/2007 | Lu et al. |
| 2007/0112792 A1 | 5/2007 | Majumder |
| 2007/0129999 A1 | 6/2007 | Zhou |
| 2007/0156664 A1 | 7/2007 | Norton et al. |
| 2007/0189272 A1 | 8/2007 | Hutchinson et al. |
| 2007/0206917 A1 | 9/2007 | Ono et al. |
| 2007/0233603 A1 | 10/2007 | Schmidgall et al. |
| 2007/0253031 A1 | 11/2007 | Fan |
| 2007/0265962 A1 | 11/2007 | Bowe, Jr. et al. |
| 2007/0282621 A1 | 12/2007 | Altman et al. |
| 2008/0039121 A1 | 2/2008 | Muller et al. |
| 2008/0086534 A1 | 4/2008 | Bardak et al. |
| 2008/0103971 A1 | 5/2008 | Lukose et al. |
| 2008/0140576 A1 | 6/2008 | Lewis et al. |
| 2008/0140681 A1 | 6/2008 | Ajibade |
| 2008/0184129 A1 | 7/2008 | Cancel et al. |
| 2008/0189122 A1 | 8/2008 | Coletrane et al. |
| 2009/0016507 A1 | 1/2009 | Altberg et al. |
| 2009/0043805 A1 | 2/2009 | Masonis et al. |
| 2009/0044279 A1 | 2/2009 | Crawford et al. |
| 2009/0049036 A1 | 2/2009 | Juan et al. |
| 2009/0066722 A1 | 3/2009 | Kriger et al. |
| 2009/0094048 A1 | 4/2009 | Wallace et al. |
| 2009/0106043 A1 | 4/2009 | Buckwalter et al. |
| 2009/0144329 A1 | 6/2009 | Marlow |
| 2009/0150330 A1 | 6/2009 | Gobeyn et al. |
| 2009/0164464 A1 | 6/2009 | Carrico et al. |
| 2009/0216734 A1 | 8/2009 | Aghajanyan et al. |
| 2009/0248599 A1 | 10/2009 | Hueter et al. |
| 2009/0299645 A1 | 12/2009 | Colby et al. |
| 2009/0319466 A1 | 12/2009 | Liu et al. |
| 2010/0002920 A1 | 1/2010 | Cosatto et al. |
| 2010/0036806 A1 | 2/2010 | Lam et al. |
| 2010/0042471 A1 | 2/2010 | Chang |
| 2010/0070350 A1 | 3/2010 | Paunikar et al. |

(56) References Cited

U.S. PATENT DOCUMENTS

| | | |
|---|---|---|
| 2010/0077032 A1 | 3/2010 | Drennan et al. |
| 2010/0094767 A1* | 4/2010 | Miltonberger ..... G06Q 30/0225 705/348 |
| 2010/0114614 A1 | 5/2010 | Sharpe |
| 2010/0145869 A1 | 6/2010 | Brown |
| 2010/0169262 A1 | 7/2010 | Kenedy et al. |
| 2010/0169376 A1 | 7/2010 | Chu |
| 2010/0262611 A1 | 10/2010 | Frind |
| 2010/0312713 A1 | 12/2010 | Keltner |
| 2010/0318544 A1 | 12/2010 | Nicolov |
| 2011/0045801 A1 | 2/2011 | Parker, II |
| 2011/0055210 A1 | 3/2011 | Meredith et al. |
| 2011/0082824 A1 | 4/2011 | Allison et al. |
| 2011/0107260 A1 | 5/2011 | Park et al. |
| 2011/0125509 A1 | 5/2011 | Lidstrom et al. |
| 2011/0131085 A1 | 6/2011 | Wey |
| 2011/0145238 A1 | 6/2011 | Stork |
| 2011/0167059 A1 | 7/2011 | Fallah |
| 2011/0178881 A1 | 7/2011 | Pulletikurty |
| 2011/0184958 A1 | 7/2011 | Krishnamoorthy et al. |
| 2011/0191768 A1 | 8/2011 | Smith |
| 2011/0208737 A1 | 8/2011 | Shmueli et al. |
| 2011/0209068 A1 | 8/2011 | Vemuri |
| 2011/0219310 A1 | 9/2011 | Robson |
| 2011/0231396 A1 | 9/2011 | Dhara et al. |
| 2011/0270813 A1 | 11/2011 | Cok et al. |
| 2011/0306028 A1 | 12/2011 | Galimore |
| 2012/0005204 A1 | 1/2012 | Diaz et al. |
| 2012/0023566 A1 | 1/2012 | Waterson et al. |
| 2012/0023567 A1 | 1/2012 | Hammad |
| 2012/0028230 A1 | 2/2012 | Devereux |
| 2012/0059850 A1 | 3/2012 | Bent et al. |
| 2012/0088524 A1 | 4/2012 | Moldavsky et al. |
| 2012/0089618 A1 | 4/2012 | Anschutz et al. |
| 2012/0102410 A1 | 4/2012 | Gewecke et al. |
| 2012/0109959 A1 | 5/2012 | Benhadda |
| 2012/0110085 A1 | 5/2012 | Malik et al. |
| 2012/0123828 A1 | 5/2012 | Pahls et al. |
| 2012/0151417 A1 | 6/2012 | Wong et al. |
| 2012/0155296 A1 | 6/2012 | Kashanian |
| 2012/0158586 A1 | 6/2012 | Ganti et al. |
| 2012/0166285 A1 | 6/2012 | Shapiro et al. |
| 2012/0190386 A1 | 7/2012 | Anderson |
| 2012/0197802 A1 | 8/2012 | Smith et al. |
| 2012/0198002 A1 | 8/2012 | Goulart et al. |
| 2012/0278262 A1 | 11/2012 | Morgenstern et al. |
| 2012/0284212 A1 | 11/2012 | Lin et al. |
| 2012/0284341 A1 | 11/2012 | Masood et al. |
| 2012/0290978 A1 | 11/2012 | Devecka |
| 2013/0013541 A1 | 1/2013 | Juan et al. |
| 2013/0028521 A1 | 1/2013 | Yabu |
| 2013/0097246 A1 | 4/2013 | Zifroni et al. |
| 2013/0135451 A1 | 5/2013 | Hou |
| 2013/0138741 A1 | 5/2013 | Redstone et al. |
| 2013/0139236 A1* | 5/2013 | Rubinstein .......... H04L 63/1466 726/26 |
| 2013/0179504 A1 | 7/2013 | Adams et al. |
| 2013/0204710 A1 | 8/2013 | Boland et al. |
| 2013/0212680 A1 | 8/2013 | Winn et al. |
| 2013/0247149 A1 | 9/2013 | Sanft et al. |
| 2013/0262984 A1 | 10/2013 | Mehr et al. |
| 2013/0282745 A1 | 10/2013 | Mishra et al. |
| 2013/0297590 A1 | 11/2013 | Zukovsky et al. |
| 2013/0325923 A1 | 12/2013 | Jin |
| 2013/0325948 A1 | 12/2013 | Chen et al. |
| 2014/0025702 A1 | 1/2014 | Curtiss et al. |
| 2014/0052861 A1 | 2/2014 | Frind et al. |
| 2014/0058763 A1 | 2/2014 | Zizzamia et al. |
| 2014/0079297 A1 | 3/2014 | Tadayon et al. |
| 2014/0095598 A1 | 4/2014 | Schornack et al. |
| 2014/0095603 A1 | 4/2014 | Bhardwaj et al. |
| 2014/0122628 A1 | 5/2014 | Yao et al. |
| 2014/0136933 A1 | 5/2014 | Berger et al. |
| 2014/0137004 A1 | 5/2014 | Berger et al. |
| 2014/0152773 A1 | 6/2014 | Ohba et al. |
| 2014/0156750 A1 | 6/2014 | De Cristofaro et al. |
| 2014/0207637 A1 | 7/2014 | Groarke |
| 2014/0258366 A1 | 9/2014 | L'Heureux et al. |
| 2014/0317736 A1 | 10/2014 | Cao et al. |
| 2015/0026027 A1 | 1/2015 | Priess et al. |
| 2015/0100530 A1 | 4/2015 | Mnih et al. |
| 2015/0120583 A1 | 4/2015 | Zarrella |
| 2015/0127590 A1 | 5/2015 | Gay et al. |
| 2015/0161649 A1 | 6/2015 | Eggleston et al. |
| 2015/0199010 A1 | 7/2015 | Coleman et al. |
| 2015/0348208 A1 | 12/2015 | Nordyke et al. |
| 2015/0379574 A1 | 12/2015 | Pattan et al. |
| 2016/0292688 A1 | 10/2016 | Barton et al. |
| 2017/0242569 A1 | 8/2017 | Frind et al. |
| 2018/0039773 A1 | 2/2018 | Levi et al. |
| 2018/0052991 A1 | 2/2018 | Levi et al. |
| 2020/0233854 A1 | 7/2020 | Kuchka et al. |

OTHER PUBLICATIONS

Runnan Tan · Qingfeng Tan · Peng Zhang · Zhao Li; Graph Neural Network for Ethereum Fraud Detection; 2021 IEEE International Conference on Big Knowledge (ICBK) (2021, pp. 78-85); (Year: 2022).*

Dirk Hoffstadt · Erwin Rathgeb · Matthias Liebig · Ralf Meister · Yacine Rebahi · Tran Quang Thanh; A comprehensive framework for detecting and preventing VoIP fraud and misuse; 2014 International Conference on Computing, Networking and Communications (ICNC) (2014, pp. 807-813); (Year: 2014).*

Alsaleh, "Improving Matching . . . " Computer Sci Discipline 313-320, 2011.

Arbelaitz et al., "Web usage and content mining to extract knowledge for modelling the users of the Bidasoa Turismo website and to adapt it," *Expert Systems with Applications* 40:7478-7491, 2013.

Artzi et al., "Predicting Responses to Microblog Posts".

Avrahami et al., "Responsiveness in Instant Messaging: Predictive Models Supporting Inter-Personal Communication".

"Binary Search Tree" Wikipedia—Feb. 24, 2015—11 pages.

Brammer, "Who Commits Online Advertising Fraud and How to Stop It," published online on Sep. 21, 2015, downloaded from http://blog.ezanga.com/blog/who-commits-online-advertising-fraud-and-how-to-stop-it on Jun. 16, 2018, 8 pages.

Caldeira et al., "Fraud Analysis and Prevention in e-Commerce Transactions," 2014 9th Latin American Web Congress, pp. 42-49, 2014.

"Chargeback" Wikipedia—Feb. 24, 2015—4 pages.

Dokoohaki et al., "Mining Divergent Opinion Trust Networks through Latent Dirichlet Allocation," *2012 IEEE ACM International Conference on Advances in Social Networks Analysis and Mining*, Istanbul, Turkey, 2012, 879-886.

Eastwood et al., "Risk Profiler in Automated Human Authentication," 2014 IEEE Symposium on Computational Intelligence for Engineering Solutions (CIES), pp. 140-147, 2015.

Fiore et al., "Assessing Attractiveness in Online Dating Profiles" CHI Friends, Foe, and Family, 2998, pp. 797-806.

Gehani et al., "PAST : Probabilistic Authentication of Sensor Timestamps," *Proceedings of the 22nd Annual Computer Security Applications Conference (ACSAC'06)*, 2006, 10 pages.

Grüner et al., "Using Probabilistic Attribute Aggregation for Increasing Trust in Attribute Assurance," 2019 IEEE Symposium Series on Computational Intelligence (SSCI), Dec. 6-9, 2019, Xiamen, China, pp. 633-640, 2019.

Kapourniotis et al., "Scam and Fraud Detection in VoIP Networks: Analysis and Countermeasures Using User Profiling," IEEE, 2011, 5 pages.

Khadangi et al., "Measuring Relationship Strength in Online Social Networks based on users' activities and profile information," *3rd International Conference on Computer and Knowledge Engineering*, Ferdowsi University of Mashhad, Oct. 31 and Nov. 1, 2013, 5 pages.

Kononenko "Semi-Naïve Bayesian Classifier".

"Merchant Account" Wikipedia—Feb. 24, 2015—10 pages.

(56) References Cited

OTHER PUBLICATIONS

Moulin et al., "Support Vector Machines for Transient Stability Analysis of Large-Scale Power Systems," *IEEE Transactions on Power Systems* 19(2):818-825, 2004.
Notice of Allowance, dated Aug. 2, 2017, for U.S. Appl. No. 14/668,808, Levi et al., "Apparatus, Method and Article to Effect User Interest-Based Matching in a Network Environment," 10 pages.
Office Action, dated Dec. 29, 2017, for U.S. Appl. No. 14/575,888, MacKinnon, "Apparatus, Method and Article to Facilitate Exchange of Messages in a Network Environment," 31 pages.
Office Action, dated Feb. 1, 2018, for U.S. Appl. No. 14/638,225, Tekle et al., "Apparatus, Method and Article to Facilitate Automatic Detection and Removal of Fraudulent Advertising Accounts in a Network Environment," 38 pages.
Office Action, dated Feb. 28, 2018, for U.S. Appl. No. 14/679,792, Oldridge et al., "Apparatus, Method and Article to Predict and Prevent Chargebacks in a Network Environment," 64 pages.
Office Action, dated Mar. 20, 2018, for U.S. Appl. No. 14/737,121, Oldridge et al., "Apparatus, Method and Article to Facilitate User Behavioral Based Determination of User Values in a Network Environment," 39 pages.
Office Action, dated Jul. 26, 2018, for U.S. Appl. No. 14/575,888, MacKinnon, "Apparatus, Method and Article to Facilitate Exchange of Messages in a Network Environment," 41 pages.
Office Action, dated Oct. 11, 2018, for U.S. Appl. No. 14/204,939, Kuchka et al., "Apparatus, Method and Article to Identify Discrepancies Between Clients and in Response Prompt Clients in a Networked Environment," 66 pages.
Office Action, dated Aug. 28, 2018, for U.S. Appl. No. 15/782,354, Levi et al., "Apparatus, Method and Article to Facilitate Automatic Detection and Removal of Fraudulent User Information in a Network Environment," 9 pages.
Geroimenko (Ed.) et al., *Visualizing the Semantic Web*, Springer, London, 2006, Chapter 14, pp. 229-241, Paolillo et al., "Social Network Analysis on the Semantic Web: Techniques and Challenges for Visualizing FOAF," 13 pages.
Parimi et al., "Predicting Friendship Links in Social Networks Using a Topic Modeling Approach," *PAKDD, Proceedings, part II*, Shenzhen, China, May 2011, pp. 75-86.
Peled et al., "Entity Matching in Online Social Networks," *International Conference on Social Computing* (*SocialCom*), Alexandria, VA, 2013, pp. 339-344.
Sharma et al., "A Neural Network based Approach for Predicting Customer Churn in Cellular Network Services," *International Journal of Computer Applications* (0975-8887) 27(11):26-31, 2011.
"Understanding Chargebacks . . ." DalPay—Feb. 24, 2015—6 pages.
Therneau et al., Mayo Clinic—Feb. 24, 2015—62 pages.
Zhao et al., "Relationship strength estimation for online social networks with the study on Facebook," Neurocomputing 95:89-97, 2012.
Frind et al., "Apparatus, Method and Article to Facilitate Matching of Clients in a Networked Environment," U.S. Appl. No. 14/339,328, filed Jul. 23, 2014, 135 pages.
Frind et al., "Apparatus, Method and Article to Facilitate Matching of Clients in a Networked Environment," Preliminary Amendment filed Jul. 23, 2014, for U.S. Appl. No. 14/339,328, 11 pages.
Frind et al., "Systems and Methods for Training and Employing a Machine Learning System in Evaluating Entity Pairs," U.S. Appl. No. 14/163,849, filed Jan. 24, 2014, 75 pages.
Office Action, mailed Jan. 29, 2016, for U.S. Appl. No. 14/163,849, Frind et al., "Systems and Methods for Training and Employing a Machine Learning System in Evaluating Entity Pairs," 61 pages.
Frind et al., "Systems and Methods for Training and Employing a Machine Learning System in Evaluating Entity Pairs," Amendment filed May 27, 2016, for U.S. Appl. No. 14/163,849, 23 pages.
Office Action, dated Aug. 16, 2016, for U.S. Appl. No. 14/163,849, Frind et al. "Systems and Methods for Training and Employing a Machine Learning System in Evaluating Entity Pairs," 60 pages.
Notice of Allowance, mailed Feb. 10, 2017, for U.S. Appl. No. 14/163,849, Frind et al., "Systems and Methods for Training and Employing a Machine Learning System in Evaluating Entity Pairs," 5 pages.
Frind et al., "System and Methods for Training and Employing a Machine Learning System in Evaluating Entity Pairs," U.S. Appl. No. 61/756,912, filed Jan. 25, 2013, 75 pages.
Frind, "System and Method for Adaptive Matching of User Profiles Based on Viewing and Contact Activity for Social Relationship Services," Preliminary Amendment filed May 24, 2011, for U.S. Appl. No. 12/488,512, 22 pages.
Office Action mailed Aug. 16, 2011, for U.S. Appl. No. 12/488,512, Frind, "System and Method for Adaptive Matching of User Profiles Based on Viewing and Contact Activity for Social Relationship Services," 14 pages.
Frind, "System and Method for Adaptive Matching of User Profiles Based on Viewing and Contact Activity for Social Relationship Services," Amendment filed Nov. 16, 2011, for U.S. Appl. No. 12/488,512, 16 pages.
Office Action mailed Mar. 5, 2012, For U.S. Appl. No. 12/488,512, Frind, "System and Method for Adaptive Matching of User Profiles Based on Viewing and Contact Activity for Social Relationship Services," 19 pages.
Frind, "System and Method for Adaptive Matching of User Profiles Based on Viewing and Contact Activity for Social Relationship Services," Amendmend, dated May 24, 2012, for U.S. Appl. No. 12/488,512, 20 pages.
Office Action mailed May 19, 2014, for U.S. Appl. No. 12/488,512, Frind, "System and Method for Adaptive Matching of User Profiles Based on Viewing and Contact Activity for Social Relationship Services," 20 pages.
Frind, "System and Method for Adaptive Matching of User Profiles Based on Viewing and Contact Activity for Social Relationship Services," Amendment filed Aug. 12, 2014, for U.S. Appl. No. 12/488,512, 11 pages.
Office Action mailed Nov. 18, 2014, for U.S. Appl. No. 12/488,512, Frind, "System and Method for Adaptive Matching of User Profiles Based on Viewing and Contact Activity for Social Relationship Services," 17 pages.
Frind, "System and Method for Adaptive Matching of User Profiles Based on Viewing and Contact Activity for Social Relationship Services," Response Under 37 CFR 1.116 filed Jan. 6, 2015, for U.S. Appl. No. 12/488,512, 12 pages.
Frind, "System and Method for Adaptive Matching of User Profiles Based on Viewing and Contact Activity for Social Relationship Services," Amendment filed Feb. 13, 2015, for U.S. Appl. No. 12/488,512, 12 pages.
Office Action, mailed Jun. 24, 2015, for U.S. Appl. No. 12/488,512, Frind, "System and Method for Adaptive Matching of User Profiles Based on Viewing and Contact Activity for Social Relationship Services," 19 pages.
Frind, "System and Method for Adaptive Matching of User Profiles Based on Viewing and Contact Activity for Social Relationship Services," Amendment filed Sep. 24, 2015, for U.S. Appl. No. 12/488,512, 14 pages.
Frind, "System and Method for Adaptive Matching of User Profiles Based on Viewing and Contact Activity for Social Relationship Services," Amendment filed Mar. 11, 2016, for U.S. Appl. No. 12/488,512, 15 pages.
Notice of Allowance, mailed Aug. 24, 2016, for U.S. Appl. No. 12/488,512, Frind, "System and Method for Adaptive Matching of User Profiles Based on Viewing and Contact Activity for Social Relationship Services," 20 pages.
Kuchka et al., "Apparatus, Method and Article to Identify Discrepancies Between Clients and in Response Prompt Clients in a Networked Environment," U.S. Appl. No. 14/204,939, filed Mar. 11, 2014, 92 pages.
Office Action, mailed Apr. 4, 2016, for U.S. Appl. No. 14/204,939, Kuchka et al., "Apparatus, Method and Article to Identify Discrepancies Between Clients and in Response Prompt Clients in a Networked Environment," 80 pages.
Kuchka et al., "Apparatus, Method and Article to Identify Discrepancies Between Clients and in Response Prompt Clients in a

(56) References Cited

OTHER PUBLICATIONS

Networked Environment," Amendment, Filed Aug. 4, 2016, for U.S. Appl. No. 14/204,939, 38 pages.
Office Action, dated Sep. 8, 2016, for U.S. Appl. No. 14/204,939, Kuchka et al., "Apparatus, Method and Article to Identify Discrepancies Between Clients and in Response Prompt Clients in a Networked Environment," 104 pages.
Office Action, dated May 17, 2017, for U.S. Appl. No. 14/204,939, Kuchka et al., "Apparatus, Method and Article to Identify Discrepancies Between Clients and in Response Prompt Clients in a Networked Environment," 82 Pages.
Levi et al., "Apparatus, Method and Article to Effect User Interest-Based Matching in a Network Environment," U.S. Appl. No. 14/668,808, filed Mar. 25, 2015, 111 pages.
Levi et al., "Apparatus, Method and Article to Effect User Interest-Based Matching in a Network Environment," U.S. Appl. No. 61/976,296, filed Apr. 7, 2014, 111 pages.
MacKinnon, "Apparatus, Method and Article to Facilitate Exchange of Messages in a Network Environment," U.S. Appl. No. 14/575,888, filed Dec. 18, 2014, 83 pages.
MacKinnon, "Apparatus, Method and Article to Facilitate Exchange of Messages in a Network Environment," U.S. Appl. No. 61/918,466, filed Dec. 19, 2013, 83 pages.
Oldridge et al., "Apparatus, Method and Article to Effect Electronic Message Reply Rate Matching in a Network Environment," U.S. Appl. No. 14/563,504, filed Dec. 8, 2014, 55 pages.
Office Action, dated Jul. 5, 2017, for U.S. Appl. No. 14/563,504, Oldridge et al., "Apparatus, Method and Article to Effect Electronic Message Reply Rate Matching in a Network Environment," 20 pages.
Oldridge et al., "Apparatus, Method and Article to Facilitate User Behavioral Based Dertermination of User Values in a Network Environment," U.S. Appl. No. 62/013,849, filed Jun. 18, 2014, 68 pages.
Oldridge et al. "Systems and Methods for Training and Employing a Machine Learning System in Providing Service Level Upgrade Offers," U.S. Appl. No. 61/974,129, filed Apr. 2, 2014, 95 pages.
Oldridge et al., "Systems and Methods for Training and Employing a Machine Learning System in Providing Service Level Upgrade Offers," U.S. Appl. No. 14/672,749, filed Mar. 30, 2015, 95 pages.
Tekle et al. "Apparatus, Method and Article to Facilitate Automatic Detection and Removal of Fraudulent Advertising Accounts in a Network Environment," U.S. Appl. No. 61/948,159, filed Mar. 5, 2014, 79 pages.
Tekle et al., "Apparatus, Method and Article to Facilitate Automatic Detection and Removal of Fraudulent Advertising Accounts in a Network Environment," U.S. Appl. No. 14/638,225, filed Mar. 4, 2015, 79 pages.
Office Action, dated Jul. 13, 2017, for U.S. Appl. No. 14/638,225, Tekle et al., "Apparatus, Method and Article to Facilitate Automatic Detection and Removal of Fraudulent Advertising Accounts in a Network Environment," 59 pages.
Office Action, mailed Sep. 21, 2015, for U.S. Appl. No. 13/971,483, Frind et al. "Apparatus, Method and Article to Facilitate Matching of Clients in a Networked Environment," 25 pages.
Frind et al., "Apparatus, Method and Article to Facilitate Matching of Clients in a Networked Environment," Amendment filed Dec. 8, 2015, for U.S. Appl. No. 13/971,483, 33 pages.
Office Action, mailed Apr. 6, 2016, for U.S. Appl. No. 13/971,483, Frind et al., "Apparatus, Method and Article to Facilitate Matching of Clients in a Networked Environment," 26 pages.
Frind et al., "Apparatus, Method and Article to Facilitate Matching of Clients in a Networked Environment," Response Under 37 CFR 1.116, filed Jul. 21, 2016, for U.S. Appl. No. 13/971,483, 21 pages.
Supplemental Notice of Allowability, mailed Oct. 28, 2016, for U.S. Appl. No. 13/971,483, Frind et al., "Apparatus, Method and Article to Facilitate Matching of Clients in a Networked Environment," 9 pages.
Frind et al., "Apparatus, Method and Article to Facilitate Matching of Clients in a Networked Environment," U.S. Appl. No. 61/691,082, filed Aug. 20, 2012, 131 pages.
Oldridge et al., "Apparatus, Method and Article to Facilitate User Behavioral Based Determination of User Values in a Network Environment," U.S. Appl. No. 14/737,121, filed Jun. 11, 2015, 68 pages.
Oldridge et al., "Apparatus, Method and Article to Predict and Prevent Chargebacks in a Network Environment," U.S. Appl. No. 14/679,792, filed Apr. 6, 2015, 69 pages.
Frind et al., "Apparatus, Method and Article to Facilitate Matching of Clients in a Networked Environment," U.S. Appl. No. 61/857,617, filed Jul. 23, 2013,138 pages.
Oldridge et al., "Apparatus, Method and Article to Effect Electronic Message Reply Rate Matching in a Network Environment," U.S. Appl. No. 61/914,154, filed Dec. 10, 2013, 50 pages.
Kuchka et al., "Apparatus, Method and Article to Identify Discrepancies Between Clients and in Response Prompt Clients in a Networked Environment," U.S. Appl. No. 61/780,391, filed Mar. 13, 2013, 92 pages.
Office Action, mailed Sep. 20, 2016, for U.S. Appl. No. 14/339,328, Frind et al., "Apparatus, Method and Article to Facilitate Matching of Clients in a Networked Environment," 30 pages.
Notice of Allowance, mailed Feb. 3, 2017, for U.S. Appl. No. 14/339,328, Frind et al., "Apparatus, Method and Article to Facilitate Matching of Clients in a Networked Environment," 14 pages.
Office Action, dated Jul. 10, 2018, for U.S. Appl. No. 14/672,749, Oldridge et al., "Systems and Methods for Training and Employing a Machine Learning System in Providing Service Level Upgrade Offers," 66 Pages.
Notice of Allowance, mailed Jun. 20, 2018, for U.S. Appl. No. 14/638,225, Tekle et al., "Apparatus, Method and Article to Facilitate Automatic Detection and Removal of Fraudulent Advertising Accounts in a Network Environment," 12 pages.
Srivastava et al., "Credit Card Fraud Detection Using Hidden Markov Model," *IEEE Transactions on Dependable and Secure Computing* 5(1):37-48, 2008.

* cited by examiner

APPARATUS, METHOD AND ARTICLE TO FACILITATE AUTOMATIC DETECTION AND REMOVAL OF FRAUDULENT USER INFORMATION IN A NETWORK ENVIRONMENT

BACKGROUND

Technical Field

The present disclosure generally relates to computing systems and methods, and in particular to systems and methods that facilitate the detection of suspected fraudulent user profiles in computing systems and networks.

Description of the Related Art

The term "Web 2.0" has been used to describe Web sites providing information and entertainment to users in a non-static format. In particular Web 2.0 has often been used to describe content delivered using a person-to-person or person-to-group environment such as those found on social networking sites, blogs, wikis, folksonomies, and video sharing sites. In many instances, users of such sites may provide personal or other information either as part of a site registration process, or in dialog with other site users. In many instances, such information is used to facilitate linking between site user who may share similar interests, personalities, or profiles. In some instances, users who are "matched" or otherwise introduced to each other by the Website may exchange additional information either as a "private" or similar connection between users through the Website itself or external to the Website, for example via direct or screened email exchanges between users. Users may exchange information through relationships developed with Website users, including information of a personal nature such as photographs, financial information, family information, and the like either through the Website or external to the Website (e.g., via email).

While many users are scrupulous in their dealings with other users in such environments, on occasion less scrupulous users may also participate in an attempt to extract information of a personal nature from unwary users. Among other things, such information may be used to commit identity theft, blackmail, fraud, phishing, misdirection, click fraud, or for other nefarious purposes. For example, in some instances, a scammer may generate a number of false or shadow profiles to interact with other users and, on occasion extract personal information from those users. At times, tens, hundreds, or even thousands of false or shadow users may be generated through the use of a software routine that repeatedly connects to a Website and creates a user profile. In some instances, a plurality of computers may be infected with malware and operated covertly as "bots" in a bot network. For example, a plurality of computers operating as bots may be autonomously or manually controlled or caused to generate fraudulent user profiles. The computers or bots typically use a random or semi-random mixture of registration data retrieved from a defined set of user registration data selected by the scammer. Over time, left unchecked such bots can create tens, hundreds, or even thousands of false or shadow user profiles. For example, a scammer may determine that middle age men are more susceptible to exchanging information with 25-35 year old females. With such information, the scammer can create a bot to generate user profiles representative of typical 25-35 year old women. Once an unwary user begins communicating with one of the shadow users, the scammer can direct the information exchange between the shadow user and the valid site user to extract desired information from the valid site user.

BRIEF SUMMARY

Matching service entities bring together end-users identified as having one or more common interests, aspirations, and/or goals. Matching service entities include commercial matching services that connect end-users such as product or service suppliers with other end-users such as product or service consumers. Matching service entities include personal matching services that connect end-user individuals with other end-user individuals who have expressed interests in a common subject, theme, or cause. Matching service entities may also include Websites providing one or more social media services for developing, establishing, or forming short-term relationships between end-users of the Website. Yet other matching service entities include relationship matching services that connect end-users seeking a longer term relationship with other individual end-users who may also be seeking a longer term relationship.

Typically, such matching service entities directly or indirectly collect information from an end-user to establish a user profile that identifies not only the individual but also the individual's likes, dislikes, and/or preferences. Each end-user is thus defined by an end-user profile that includes any number of logically associated end-user attributes, each having one or more associated attribute values. At least some of an end-user's attribute values may be collected directly by the matching service entity, for example through the use of surveys and questionnaires that the end-user completes as part of the registration process to participate or sign-up with the matching service entity. At least some of an end-user's attribute values may be collected indirectly by the matching service entity and may be collected autonomously by the matching service provider. For example, the Internet Protocol or IP address used to access the matching service entity by a particular end-user may be stored as an attribute value in the respective end-user's profile. In another example, an end-user's browser history may be stored as an attribute value indicative of the general interests of the respective end-user.

The matching service entity uses any number of algorithms to determine the existence of compatible matches or potential matches between end-users and to select appropriate potential "matches" for each end-user. Typically, these potential matches are presented to the end-user to follow-up via electronic message (e.g., email), telephone, or in person meetings to determine the overall level of compatibility between the end-users. In fact, much of the perceived value of such matching service entities lies in their reputation for recommending "good" or "compatible" matches for end-users. Success in the relationships formed between end-users builds the reputation of the matching service entity, increasing usage and often increasing membership and/or advertising revenue. Conversely, a matching service entity that gains a reputation for recommending "poor" or "incompatible" matches for end-users will see a loss of members and loss of membership and advertising revenue. Matching service providers therefore have an interest in recommending the best possible matches for their end-users and in ensuring the most positive experience results for each registered end-user.

Unfortunately, fraudulent end-users (e.g., scammers) may register with a matching service entity to prey on unwary end-users or to otherwise frustrate the end-users and/or matching service entity. Typically, such fraudulent end-users will generate a number of fraudulent end-user profiles on the matching service entity to increase the likelihood that one of the fraudulent end-user profiles will be matched to and develop a relationship with one or more valid end-users of the matching service. Once a relationship develops between the fraudulent end-user and the valid end-user, the fraudulent end-user is often able to leverage the relationship to obtain cash and other valuables from the valid end-user, compromise the valid end-user's computer system to perform other illegal acts, and the like. To generate a large number of fraudulent end-user profiles, the fraudulent end-user will frequently employ software, scripts, or other machine-readable instruction sets on one or more computer systems (e.g., "bots") to autonomously generate a number of profiles having attribute values selected from one or more defined sets of attribute values. For example, a fraudulent end-user may define sets of attribute values representative of a 25-35 year-old female to generate a number of user profiles having different attribute value permutations, but all of which "appear" as a 25-35 year old woman to other valid end-users. At times, such software, scripts, or other machine-readable instruction sets are executed by the fraudulent end-user's system. At other times, such software, scripts, or other machine-readable instruction sets are executed by a number of different systems (e.g., bots), each of which may operate autonomously or under the control of the fraudulent end-user to form a botnet.

The autonomous generation of fraudulent end-user profiles using a limited set of attribute values frequently results in the generation of a number of fraudulent end-user profiles having attribute values that fall into definable "clusters." A fraud detection system having the ability to identify attribute values that define these clusters permits the matching service entity to both proactively prevent the registration of suspected fraudulent end-users having profiles that include attributes that have been found indicative of fraudulent end-user profiles as well as reactively remove from the matching service database registered suspected fraudulent end-users having profiles that include attributes that have been found indicative of fraudulent end-user profiles. Such a system is also beneficially able to detect and respond to changes in fraudulent end-user behavior, for example a change in end-user attribute values including end-user personal attribute values as well as end-user system attribute values. In addition to fraudulent end-user profiles, other end-users profiles may also be deemed undesirable. Such undesirable user profiles may include user profiles logically associated with married end-users, user profiles logically associated with non-paying or delinquent paying end-users, and the like.

A fraud detection system quantifies the likelihood that any particular attribute value or combination of attribute values appear in a fraudulent or otherwise undesirable end-user profile. Using this information, the fraud detection system determines a score or value indicative of the likelihood that a selected end-user profile is fraudulent. Based on the valuation of the respective end-user profile, the fraud detection system autonomously screens or removes a fraudulent end-user profile from addition to the matching service entity end-user database, autonomously adds or saves a valid end-user profile to the matching service entity end-user database, or forwards a suspected fraudulent end-user profile to a customer service representative for additional review.

Such fraud detection systems may obtain a number of known fraudulent end-user profiles, suspected fraudulent end-user profiles, and/or otherwise undesirable end-user profiles. Using statistical analysis techniques that include clustering the end-user profiles by attributes and attribute values and/or combinations of attributes and attribute values, the fraud detection system identifies on a continuous, periodic, or aperiodic basis those attribute values and/or attribute value combinations that appear in fraudulent end-user profiles. Using this data, the fraud detection system generates one or more queries to identify those end-user profiles having attribute values or combinations of attribute values that likely indicate a fraudulent end-user profile. The fraud detection system can run these queries against incoming registrations to identify and screen fraudulent end-user profiles from addition to the matching service entity's end-user database and can also run these queries against such stored end-user profile databases to identify and remove fraudulent end-user profiles resident in the end-user database.

A method of operation in at least a portion of a system to detect at least one of accounts or related profiles suspected of being fraudulent, the system which includes at least one processor and at least one nontransitory processor-readable medium that stores at least one of processor-executable instructions or processor-executable data, the at least one nontransitory processor-readable medium communicatively coupled to the at least one processor, may be summarized as, for each of a plurality of profiles, computing by the at least one processor a representation of dissimilarity based at least in part on a respective attribute value of each of a plurality of attributes logically associated with the respective profile; performing a clustering of the profiles by the at least one processor, based on the representation of dissimilarity, the performance of the clustering resulting in a number of clusters, each cluster comprising one or more of the profiles; selecting clusters of the profiles above a threshold; in a first pass, for each of at least some of the selected clusters, identifying by the at least one processor each of a number of attributes and attribute value combinations that occur frequently in the profiles of the respective cluster; in a second pass, for each of at least some of the selected clusters and for each attribute identified as occurring frequently in the first pass, identifying by the at least one processor one or more additional attribute values for the respective attribute that occur frequently in the profiles of the respective cluster; and for each of at least some of the selected clusters, preparing a respective query to identify the accounts or the related profiles suspected of being fraudulent based at least in part on the processor identified attribute and attribute value combinations and the processor identified one or more additional attribute values.

Computing a representation of dissimilarity may include, for each of the profiles, computing a dissimilarity matrix based on the respective values of each of the number of attributes logically associated with the profile. Computing a dissimilarity matrix may include computing the dissimilarity matrix via at least one of Manhattan distances, Euclidean distances or Gower coefficients. Computing a dissimilarity matrix may include computing the dissimilarity matrix based on at least one of: an identity of an Internet Service Provider (ISP) associated with the creation of the respective profile; an identity of an operating system used during a most recent login associated with the respective profile; one or more HTTP user string properties associated with the respective profile; a login associated with the respective profile; an identified gender associated with the respective profile; a cookie associated with the respective profile; a local machine time associated with the respective profile; an electronic mail (email) domain associated with the respective profile; a signup IP domain associated with the respective profile; one or more profile details associated with the respective profile; an IP country associated with the respective profile; or a time to create the respective profile. Performing a clustering of the profiles may include performing an agglomerative clustering of the profiles based on the representation of dissimilarity. Performing a clustering of the profiles may include forming combinations of profiles that minimize an average of dissimilarities between one cluster of profiles and another cluster of profiles. Performing a clustering of the profiles may include performing a clustering based on the dissimilarity matrices of the respective profiles. Selecting clusters of profiles above a threshold may include selecting clusters which include at least a threshold number of profiles. The performance of the clustering may result in a dendrogram with a top-most node representing all of the plurality of profiles and the bottom-most nodes representing respective individual ones of the profiles, a plurality of intermediate nodes between the top-most and the bottom-most nodes representing respective sets of profiles where the profiles in any set of profiles are similar to one another to a degree, and wherein selecting clusters of profiles above a threshold may include selecting clusters below a cut line in the dendrogram. Performing a clustering of the profiles may include performing an agglomerative nesting clustering of the profiles. Performing an agglomerative nesting clustering of the profiles may include performing an agglomerative nesting clustering of the profiles using at least one of: a nearest neighbor method, a furthest neighbor method, a pair group average method, a centroid method, a median method, and Ward's method. Performing a clustering of the profiles may include performing a divisive analysis clustering of the profiles. Identifying each of a number of attributes and attribute value combinations that occur frequently in the profiles of the respective cluster may include identifying attributes and attribute value combinations that are above a minimum support threshold. Identifying any additional attribute values for the respective attribute that occur frequently in the profiles of the respective cluster may include identifying any additional attribute values that occur above a combine threshold.

The method of operation in at least a portion of a system to detect at least one of accounts or related profiles suspected of being fraudulent, the system which includes at least one processor and at least one nontransitory processor-readable medium that stores at least one of processor-executable instructions or processor-executable data, the at least one nontransitory processor-readable medium communicatively coupled to the at least one processor may further include normalizing the attribute values for at least some of the attributes before performing the clustering of the profiles.

In the first pass identifying each of a number of attributes and attribute value combinations that occur frequently in the profiles of the respective cluster may include performing association rule learning on each of the at least some of the selected clusters. In the first pass identifying each of a number of attributes and attribute value combinations that occur frequently in the profiles of the respective cluster may include conducting a depth-first search for the combinations of attribute and attribute values that form a defined minimum percentage subset of the respective cluster. Conducting a depth-first search may include executing an association rule learning method on the profiles of the respective cluster that includes at least one of: an Éclat algorithm, an Apriori algorithm, an FP-growth algorithm, GUHA Procedure ASSOC, or an OPUS search. In the second pass, the method may include, for each identified additional value, adding the identified additional value to a set of identified values for the respective attribute. Preparing a respective query may include defining attribute values for each of a number of the attributes which are indicative of a pattern of fraudulently generated profiles, and may further include: uploading the queries to a production system, the production system comprising at least one processor that is separate and distinct from the at least one processor of the system.

The method of operation in at least a portion of a system to detect at least one of accounts or related profiles suspected of being fraudulent, the system which includes at least one processor and at least one nontransitory processor-readable medium that stores at least one of processor-executable instructions or processor-executable data, the at least one nontransitory processor-readable medium communicatively coupled to the at least one processor, may further include: identifying a subset of suspicious profiles from a set of profiles; and providing the subset of suspicious profiles to the at least one processor as the plurality of profiles.

Identifying the subset of suspicious profiles may include applying a semi-naïve Bayesian classification against the set of profiles.

The method of operation in at least a portion of a system to detect at least one of accounts or related profiles suspected of being fraudulent, the system which includes at least one processor and at least one nontransitory processor-readable medium that stores at least one of processor-executable instructions or processor-executable data, the at least one nontransitory processor-readable medium communicatively coupled to the at least one processor, may further include: for each of at least some of the selected clusters, preparing a respective second query to identify the accounts or the related profiles suspected of being fraudulent based at least in part on the processor identified attribute and attribute value combinations and the processor identified one or more additional attribute values; and combining by the at least one processor the query and the second query to generate a third query to identify the accounts or the related profiles suspected of being fraudulent based at least in part on the processor identified attribute and attribute value combinations and the processor identified one or more additional attribute values.

A system to detect at least one of accounts or related profiles suspected of being fraudulent may be summarized as including: at least one processor; and at least one nontransitory processor-readable medium that stores at least one of processor-executable instructions or processor-executable data, the at least one nontransitory processor-readable medium communicatively coupled to the at least one processor, wherein the at least one processor may: for each of a plurality of profiles, compute a representation of dissimilarity based at least in part on a respective attribute value of each of a plurality of attributes logically associated with the respective profile; perform a clustering of the profiles based on the representation of dissimilarity, which results in a number of clusters, each cluster comprising one or more of the profiles; select clusters of the profiles above a threshold; in a first pass, for each of at least some of the selected clusters, identify each of a number of attributes and attribute value combinations that occur frequently in the profiles of the respective cluster; in a second pass, for each of at least some of the selected clusters and for each attribute identified as occurring frequently in the first pass, identify one or more additional attribute values for the respective attribute that occur frequently in the profiles of the respective cluster; and for each of at least some of the selected clusters, prepare a respective query to identify the accounts or the related profiles suspected of being fraudulently generated based at least in part on the processor identified attribute and attribute value combinations and the one or more processor identified additional attribute values.

For each of the profiles, the at least one processor may compute a dissimilarity matrix based on the respective values of each of the number of attributes logically associated with the profile in order to compute the representation of dissimilarity. The at least one processor may compute the dissimilarity matrix via at least one of Manhattan distances, Euclidean distances or Gower coefficients. The at least one processor may compute the dissimilarity matrix based on at least one of: an identity of an Internet Service Provider (ISP) associated with the creation of the respective profile; an identity of an operating system used during a most recent login associated with the respective profile; a login associated with the respective profile; an identified gender associated with the respective profile; a cookie associated with the respective profile; an electronic mail (email) domain associated with the respective profile; a signup IP domain associated with the respective profile; one or more profile details associated with the respective profile; an IP country associated with the respective profile; or a time to create the respective profile. The at least one processor may form combinations of profiles that minimize a measure of dissimilarities between one cluster of profiles and another cluster of profiles in order to perform the clustering of the profiles. The at least one processor may perform the clustering based on the dissimilarity matrices of the respective profiles. Clusters of profiles may be selected which include at least a threshold number of profiles. The performance of the clustering may result in a dendrogram with a top-most node representing all of the plurality of profiles and the bottom-most nodes representing respective individual ones of the profiles, a plurality of intermediate nodes between the top-most and the bottom-most nodes representing respective sets of profiles where the profiles in any set of profiles are similar to one another to a degree, and clusters below a cut line in the dendrogram are selected. The at least one processor may perform an agglomerative nesting clustering of the profiles based on the representation of dissimilarity. The at least one processor may perform an agglomerative nesting clustering of the profiles based on the representation of dissimilarity using at least one of: a nearest neighbor method, a furthest neighbor method, a pair group average method, a centroid method, a median method, and Ward's method. The at least one processor may perform a divisive analysis clustering of the profiles based on the representation of dissimilarity. The at least one processor may identify attributes and attribute value combinations that are above a minimum support threshold in order to identify each of the number of attributes and attribute value combinations that occur frequently in the profiles of the respective cluster. The at least one processor may identify any additional attribute values that occur above a combine threshold. The at least one processor may further normalize the attribute values for at least some of the attributes before the clustering of the profiles. The at least one processor may perform association rule learning on each of the at least some of the selected clusters, in order to identify each of the number of attributes and attribute value combinations that occur frequently in the profiles of the respective cluster in the first pass. The at least one processor may conduct a depth-first search for the combinations of attribute and attribute values that form a defined minimum percentage subset of the respective cluster, in order to identify each of the number of attributes and attribute value combinations that occur frequently in the profiles of the respective cluster in the first pass. The at least one processor may conduct a depth-first search that includes executing an association rule learning method on the profiles of the respective cluster that includes at least one of: an Éclat algorithm, an Apriori algorithm, an FP-growth algorithm, GUHA Procedure ASSOC, or an OPUS search. The at least one processor may add the identified additional value to a set of identified values for the respective attribute, as part of the second pass. The at least one processor may further upload the queries to a production system, the production system comprising at least one processor that is separate and distinct from the at least one processor of the system. The at least one processor may further receive a subset of suspicious profiles as the plurality of profiles, the subset of suspicious profiles selected from a set of profiles. The profiles may be profiles of individuals and the attributes values may include both self-reported attribute values and non-self-reported attribute values. The at least one processor may further, for each of at least some of the selected clusters, prepare a respective second query to identify the accounts or the related profiles suspected of being fraudulently generated based at least in part on the processor identified attribute and attribute value combinations and the processor identified one or more additional attribute values; and combine the query and the second query to generate a third query to identify the accounts or the related profiles suspected of being fraudulently generated based at least in part on the processor identified attribute and attribute value combinations and the processor identified one or more additional attribute values.

A method of operation in at least a portion of a system to detect suspected fraudulently generated profiles, the system which includes at least one processor and at least one nontransitory processor-readable medium that stores at least one of processor-executable instructions or processor-executable data, the at least one nontransitory processor-readable medium communicatively coupled to the at least one processor, may be summarized as: computing, by the at least one processor, a value indicative of an initial probability of a profile in a set of profiles being at least one of a fraudulent profile [p(S)] or a valid profile [p(V)] based at least in part on historical profile data; computing, by the at least one processor, for an attribute or a combination of attributes associated with the profiles in the set of profiles, a respective value indicative of a likelihood of the attribute or the combination of attributes being associated with at least one of a fraudulent profile [p($x_i$|S)] or a valid profile [p($x_i$|V)]; and for each profile in the set of profiles, computing, by the at least one processor, a value indicative of a conditional probability that the respective profile is one of either fraudulent or valid based on an attribute or a combination of attributes associated with the respective profile determined at least in part using the respective initial probabilities and likelihoods.

Computing a value indicative of an initial probability of profiles being at least one of a fraudulent profile [p(S)] or a valid profile [p(V)] may include computing both a value indicative of the initial probability of profiles being fraudulent [p(S)] and a value indicative of the initial probability of profiles being valid [p(V)].

Computing a value indicative of a conditional probability that the respective profile is fraudulent may include computing the value indicative of a conditional probability that the respective profile is fraudulent according to:

$$p(S \mid \{x_i\}) = \frac{p(S) \prod_i^M p(x_i \mid S)}{p(S) \prod_i^M p(x_i \mid S) + p(V) \prod_i^M p(x_i \mid V)}$$

Computing a value indicative of a likelihood of the attribute or the combination of attributes being associated with at least one of a fraudulent profile [p($x_i$|S)] or a valid profile [p($x_i$|V)] may include computing the respective value indicative of a respective likelihood based at least in part on: a Hyper Text Transfer Protocol (http) referrer associated with the respective profile; an Internet Service Provider (ISP) associated with the respective profile; an Internet Protocol (IP) of signup and last logins associated with the respective profile; a count of page requests made during a sign up for the respective profile; an identity of one or more plugins present in a browser associated with the respective profile; a location (state/province/location) associated with a sign up for the respective profile; an electronic mail (email) address associated with the respective profile; an http via associated with the respective profile; an identity of one or more fonts loaded on browser associated with the respective profile; a most recent operating system (OS) associated with the respective profile; an http accept language associated with the respective profile; one or more cookies used to track individual computers associated with the respective profile; a username associated with the respective profile; a user age associated with the respective profile; a birth order associated with the respective profile; a number of siblings associated with the respective profile; one or more cookies that contain a user identifier of the most recent users to log in on using a given instance of a processor-based device; a self-identified country associated with the respective profile; an IP Country associated with the respective profile; one or more various screen properties associated with the respective profile; an identity of a browser used at signup associated with the respective profile; a self-identified profession associated with the respective profile; IP blocks of signup and at least two most recent logins associated with the respective profile; an IP country of at least two most recent visits associated with the respective profile; a time to create the respective profile; an electronic mail (email) domain associated with the respective profile; a self-identified postal or location code associated with the respective profile; one or more UTMC cookies; or one or more user keystrokes and cut and paste properties used in creating the respective profile.

The method of operation in at least a portion of a system to detect suspected fraudulently generated profiles, the system which includes at least one processor and at least one nontransitory processor-readable medium that stores at least one of processor-executable instructions or processor-executable data, the at least one nontransitory processor-readable medium communicatively coupled to the at least one processor, may further include ranking the profiles into groups.

The method of operation in at least a portion of a system to detect suspected fraudulently generated profiles, the system which includes at least one processor and at least one nontransitory processor-readable medium that stores at least one of processor-executable instructions or processor-executable data, the at least one nontransitory processor-readable medium communicatively coupled to the at least one processor, may further include providing result to a front end system for deletion, for clearance, or for investigation.

A fraudulent profile detection system to detect at least one of accounts or related profiles suspected of being fraudulently generated may be summarized as including: at least one processor; and at least one nontransitory processor-readable medium that stores at least one of processor-executable instructions or processor-executable data, the at least one nontransitory processor-readable medium communicatively coupled to the at least one processor, wherein the at least one processor may: compute a value indicative of an initial probability of a profile in a set of profiles being at least one of a fraudulent profile [p(S)] or a valid profile [p(V)] based at least in part on historical profile data; for an attribute or a combination of attributes associated with the profiles in the set of profiles, compute a respective value indicative of a likelihood of the attribute or the combination of attributes being associated with at least one of a fraudulent profile [p($x_i$|S)] or a valid profile [p($x_i$|V)]; and for each profile in the set of profiles, compute a value indicative of a conditional probability that the respective profile is one of either fraudulent or valid based on an attribute or a combination of attributes associated with the respective profile determined at least in part using the respective initial probabilities and likelihoods.

The at least one processor may compute both a value indicative of the initial probability of profiles being fraudulent [p(S)] and a value indicative of the initial probability of profiles being valid [p(V)].

The at least one processor may compute a value indicative of a conditional probability that the respective profile is fraudulent includes computing the value indicative of a conditional probability that the respective profile is fraudulent according to:

$$p(S \mid \{x_i\}) = \frac{p(S) \prod_i^M p(x_i \mid S)}{p(S) \prod_i^M p(x_i \mid S) + p(V) \prod_i^M p(x_i \mid V)}$$

The at least one processor may further rank the profiles into groups using the respective value indicative of a conditional probability that the respective profile is fraudulent. The at least one processor may further generate at least one output logically associated with each profile, the at least one output indicative of at least one of the following: a deletion indicator, a clearance indicator, or a further investigation indicator.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, server computers, and/or communications networks have not been shown or described in detail to avoid unnecessarily obscuring descriptions of the embodiments. In other instances, well-known mathematical and statistical methods for performing clustering analyses, dissimilarity analyses, and the like have not been described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
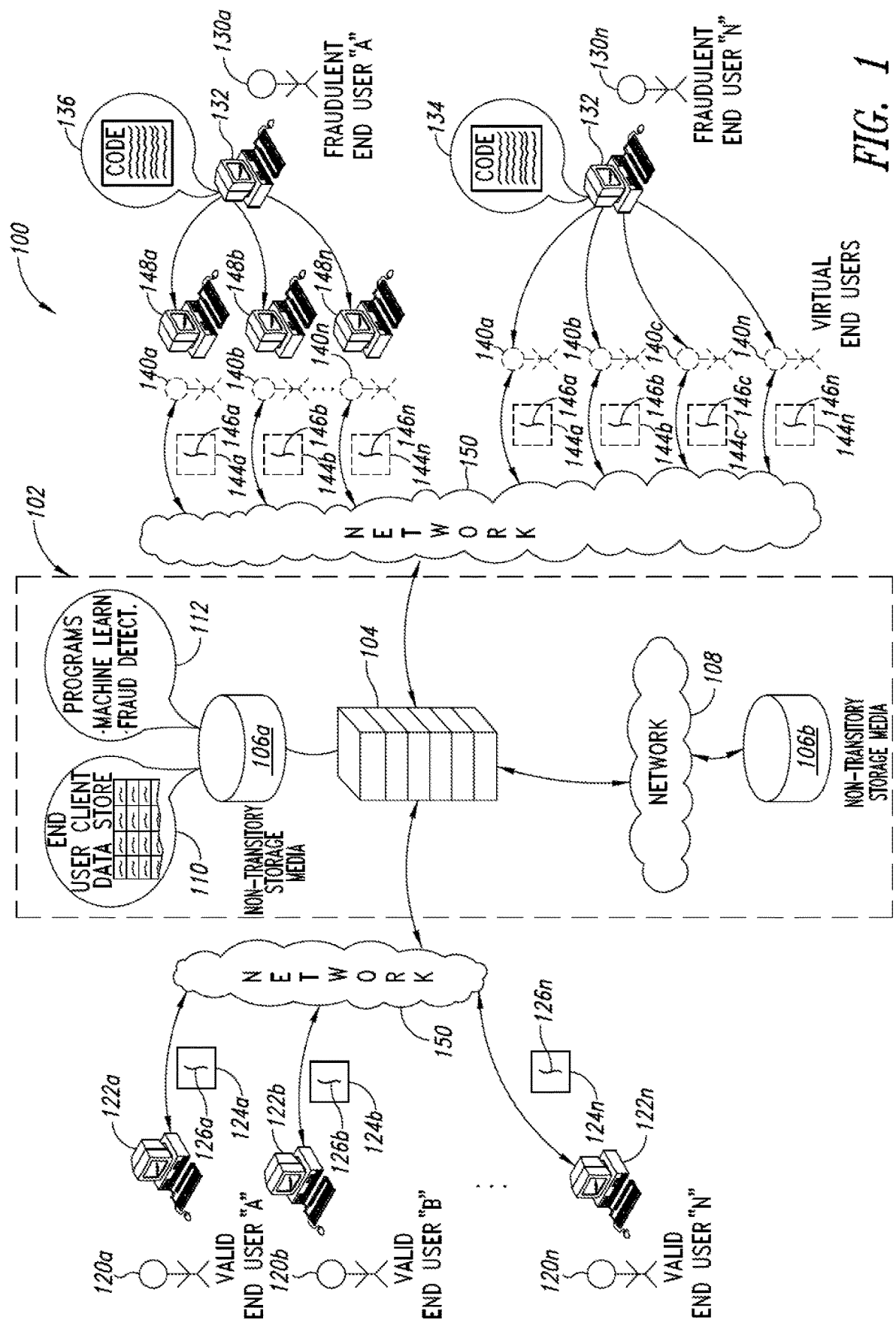
FIG. 1 is a schematic view of a networked matching service environment according to one illustrated embodiment, including a fraudulent profile detection system; and a plurality of end-user client entities of the matching service each with associated processor-based devices to provide communications with the matching service system.

FIG. 1 shows a networked environment 100 in which matching services are provided via a network 150 to a plurality of valid end-user client entities 120a-120n (only three shown, collectively "valid end-users 120") and to a number of fraudulent or otherwise undesirable end-user client entities 130a-130n (only two shown, collectively "fraudulent end-users 130," according to one illustrated embodiment. In at least some implementations, the matching services are provided by a matching service entity 102 that incorporates or is otherwise communicably coupled to one or more fraud detection system(s) 104.

Each of the valid end-users 120a-120n generates a respective profile 124a-124n (collectively, "valid end-user profile 124") that is logically associated with the respective end-user 124 by the matching service entity 102. Each end-user profile 124a-124n includes data indicative of a number of attributes 126a-126n (collectively, "valid end-user attributes 126"), each having one or more attribute values associated therewith. In some instances, valid end-user attributes 126 may correspond to or be indicative of various end-user physical, mental, and/or emotional aspects. Some or all of such valid end-user attributes 126 may be acquired directly from the end-user 120 by the matching service entity (e.g., in the form of self-reported information, questionnaires, interviews, through examination of historical text messages, through examination of historical emails provided by the end-user client entity, and the like). An example of such a self-reported attribute and attribute value illustrated by the attribute "age" and the end-user selected associated attribute value of "45-55." In some instances, some or all of such valid end-user attributes 126 may be acquired indirectly from the end-user (e.g., via personality profiles, based on examining historical interests of the end-user client, based on Websites visited by the end-user client, based on browsing habits of the end-user client, and the like).

Illustrative, non-exhaustive, examples of such self-reported end-user attributes include: an end-user generated username; an end-user supplied age; an end-user supplied profession; an end-user supplied email address/email domain; an end-user supplied state/province/location; an end-user supplied ZIP code/postal code/location code.

In some instances, the matching service entity 102 also acquires and stores any number of valid end-user attributes 126 that are autonomously provided by and/or associated with the end-user processor-based device 122 used to access the matching service entity 102. Some or all of such information may be autonomously acquired from the end-user processor-based device 122 (IEEE 802 or "MAC" address, Network Interface Card "NIC" identification, operating system, system cookie data, plugins data, time required to create the end-user client, etc.). Some or all of such valid end-user attributes and attribute values 126 may be acquired from the internet service provider ("ISP") and/or networks used by the end-user processor-based device 122 to access the matching service entity 102 (Internet Protocol "IP" address, ISP information, end-user client location information, email domain name, sign-up domain name, IP country, etc.).

Illustrative, non-exhaustive, examples of such autonomously collected end-user attributes include: a referring Website or URL location; the ISP; the IP address associated with an end-user signup and/or last logon; the plugins present in the end-user's browser; the http via; the end-user's last operating system; cookies present on the end-user's system; the country of the IP used by the end-user; the browser used by the end-user to signup; the IP blocks of the last two end-user sign-in events; the IP country of the last two end-user visits; the time required to create an end-user profile; and user keystrokes and cut and paste properties for creating an end-user profile.

Valid end-user profiles 124 along with the logically associated attribute(s) 126 and attribute value(s) are stored in a number of end-user data stores or databases 110 that are retained, stored, and/or maintained on nontransitory storage media 106a-106b (collectively, "nontransitory storage media 106"). The nontransitory storage media 106 may be communicably coupled to or integral with the matching service entity 102 and/or fraud detection system 104. In some instances, at least a portion of the nontransitory storage media 106a may be disposed local to the matching service entity 102 and/or fraud detection system 104. In some instances, at least a portion of the nontransitory storage media 106b may be disposed remote from the matching service entity 102 and/or fraud detection system 104 and communicably coupled via one or more networks 108 (e.g., local area networks "LANs;" wide area networks "WANs;" or worldwide networks such as the Internet).

Each of the fraudulent end-users 130a-130n generates a number of fraudulent end-user profiles 144a-144n (collectively, "fraudulent end-user profile 144"), each logically associated with a respective virtual end-user 140a-140n. Each fraudulent end-user profile 144a-144n includes a number of attributes 146a-146n ("collectively, fraudulent end-user attributes 146") provided by the fraudulent end-user 130a-130n and/or the fraudulent end-user's respective processor-based device 132a-132n. Fraudulent end-user profiles 144, along with the logically associated attributes 146 and attribute value(s) are also stored in the number of end-user data stores or databases 110 retained, stored, and/or maintained on the nontransitory storage media 106.

In some instances, fraudulent end-user 130a may execute machine readable instruction sets that cause a number of processor-based devices 148a-148n to each generate one or more virtual end-users 140, each having a fraudulent end-user profile 144 that contains a number of logically associated fraudulent end-user attributes 146 and attribute values. An example of this type of conduct is a "botnet" attack where the fraudulent end-user 130 installs software, malware, or similar machine-readable instruction sets on a number of usually unsuspecting processor-based devices 148a-148n which then function as bots in a botnet. Either autonomously or at the direction of the fraudulent end-user 130a, each of these processor-based devices 148 will attempt to generate and register with the matching service entity 102 any number of virtual end-users 140a-140n, each logically associated with a respective fraudulent end-user profile 144a-144n.

In other instances, a processor-based device 132n operated by a fraudulent end-user 130n may execute one or more machine readable instruction sets that cause the processor-based device 132n to generate a number of virtual end-users 140a-140n, each having a respective, logically associated, fraudulent end-user profile 144a-144n having associated therewith a number of fraudulent end-user attributes 146a-146n and attribute values. An example of this type of conduct is where the fraudulent end-user 130 installs software or similar machine-readable instruction sets on the processor-based device 132n. The processor-based device 132n then functions as a bot, generating any number of virtual end-users 140a-140n, each logically associated with a respective fraudulent end-user profile 144a-144n. In at least some instances, such activity is performed by the fraudulent end-user through a series of proxies or proxy servers to mask the identity of the fraudulent end-user 130 and/or the fraudulent end-user's processor-based device 132, for example by masking processor-based device attribute values such as Internet Service Provider ("ISP") information, Internet Protocol ("IP") address, and/or physical location of the fraudulent end-user 130.

In some instances, the matching service entity 102 inadvertently or unknowingly acquires and stores any number of fraudulent end-user attributes 146 and attribute values that are autonomously provided by and/or associated with the fraudulent end-user processor-based device 132 (or by one or more proxy processor-based devices 148 infected by malware supplied by the fraudulent end-user 130). Some or all of these attributes and attribute values may be autonomously acquired from the fraudulent end-user processor-based device 132 (MAC address, NIC identification, operating system, system cookie data, plugins data, time required to create the end-user client, etc.). Some or all of such fraudulent end-user attributes 146 may be acquired from the Internet service provider ("ISP") and/or networks used by the fraudulent end-user processor-based device 132 to access the matching service entity 102 (Internet Protocol "IP" address, ISP information, end-user client location information, email domain name, sign-up domain name, IP country, etc.).

Fraudulent end-users 130 may attempt to initiate contact with valid end-users 120 via the matching services provided by the matching service entity 102. Additionally or alternatively, various processor-based devices operating as bots may attempt to initiate the contact. Such social networking services and/or matching services may include but are not limited to matching services for the supply or exchange of goods and/or services; matching services for personal friendships; matching services for individuals sharing common goals, aspirations, and/or interests; and matching services for individuals seeking romantic relationships. Once a relationship is established between a valid end-user 120 and the virtual end-user 140, the fraudulent end-user 130 is able to communicate with the valid end-user 120 through the virtual end-user 140. Such communication may occur through the matching service entity 102 or external to the matching service entity 102 (e.g., via email, text message, letter, and/or telephone). In some instances, the fraudulent end-user 130 can then extract personal information and/or financial information from the valid end-user 120 thereby exposing the valid end-user to activities such as fraud (e.g., an overseas love interest that requires money to travel or for a sick relative) and identity theft (e.g., the valid end-user's financial information is needed to acquire travel documents).

In some instances, the fraudulent end-user 130 may use the fraudulent end-user processor-based device 132n and/or one or more malware infected processor-based devices 148 to collect information from valid end-users 120 of the matching service entity 102. For example, either autonomously or at the direction of a fraudulent end-user 130, the fraudulent end-user processor-based device 132n or one or more proxy processor-based devices 148 may autonomously message, communicate, or otherwise electronically exchange information with one or more valid end-users 120. Upon receiving a response to the autonomously generated message or communication from the valid end-user, the fraudulent end-user processor-based device 132n or one or more proxy processor-based devices 148 may scrape or otherwise extract information (e.g., email information, telephone number information, address information) from the response.

In some instances, the fraudulent end-user 130 may use the fraudulent end-user processor-based device 132n and/or one or more malware infected processor-based devices 148 to cause information or messages to be directed to a valid end-user 120. For example, either autonomously or at the direction of a fraudulent end-user 130, the fraudulent end-user processor-based device 132n or one or more proxy processor-based devices 148 may autonomously generate one or more messages to one or more valid end-users 120. When a valid end-user responds to the message, the fraudulent end-user processor-based device 132n and/or one or more malware infected processor-based devices 148 ignore the response, thereby leading the valid end-user 120 to believe that a rejection of their expressed interest has been rejected. Over time, such rejections can create an online environment where valid end-users 120 become frustrated with the perceived lack of response from what the valid end-user believes to be other "end-users."

Fraudulent end-users 130 may use statistical information or other insight to target a particular group or segment of the population of valid end-users 120. For example, a fraudulent end-user 130 may determine that men over 50 years of age are most susceptible to engaging in relationships with women between the ages of 25 and 35 via the matching service entity 120. Using this information, the fraudulent end-user 130 may create or generate malware or other machine-readable instruction sets that cause one or more proxy processor-based devices 148 to either autonomously or at the direction of the fraudulent end-user 130, generate a number of virtual end-users 140a-140n, each having a respective, logically associated, fraudulent end-user profile 144a-144n containing attributes 146a-146n and attribute values corresponding to a 25-35 year old woman. Thus, the fraudulent end-user profiles 144a-144n generated by a fraudulent end-user 130 will each have logically associated a group fraudulent end-user attributes 146. The attribute values associated with each of the fraudulent end-user attributes may be selected from one or more defined groups of attribute values. For example, if the fraudulent end-user profile 144 includes the attribute "hair color," the fraudulent end-user 130 may define a set of attribute values consisting of "blonde, brunette, and black" from which one attribute value is selected at random when generating a fraudulent end-user profile 146. Although an end-user profile may include a number of attributes, the fact that the attribute values are selected from a defined and/or targeted set of attribute values selected by the fraudulent end-user 130 effectively limits the available number of attribute value permutations. Thus, each of the fraudulent end-user profiles 144a-144n included within the population of fraudulent profiles generated by a fraudulent end-user 130 will demonstrate at least a limited similarity of attributes 146 or parameter combinations (female, 25-35 years old, IP address of profile generation, date and time of profile generation, etc.). In contrast, the diversity existent in the population of valid end-users 120 generally results in dissimilar or a broader and/or more varied distribution of valid end-user attributes 126 across a population of valid end-user profiles 124.

The success of a matching service ultimately depends upon the perceived value of the service to valid end-users 120. Successful pairings resulting in favorable exchanges of goods and/or services, friendships, groups of individuals sharing common interests, and long-term romantic relationships add to the perceived value of the matching service to valid end-users. Conversely, fraud, identity theft, and the overall feeling of loss and mistrust engendered by the activities of fraudulent end-users 130 rapidly detracts from the perceived value of the matching service to valid end-users 120. Thus, the detection and prevention of fraudulent end-user sign-ups and the prompt and ongoing detection and removal of fraudulent end-user profiles from end-user data stores or databases provides an important step in improving the perceived and actual value of the matching service entity 102.

The fraud detection system 104 provides the matching service entity 102 with the ability to autonomously, semi-autonomously, or manually "learn" the end-user attributes 146 and attribute values and/or combinations of end-user attributes and attribute values that are most frequently found in fraudulent end-user profiles 144. In at least some implementations, the fraud detection system 104 may also provide the matching service entity 102 with the ability to autonomously, semi-autonomously, or manually "learn" the end-user attributes 126 and attribute values and/or combinations of end-user attributes and attribute values most frequently found in valid end-user profiles 124. Advantageously, in addition to identifying these attribute and attribute value patterns, the fraud detection system 104 provides a mechanism for reliability and at least semi-autonomously distinguishing between valid end-user profiles 124 and fraudulent end-user profiles 144.

One or more programs or similar machine-readable instruction sets 112 that provide either or both machine learning and/or fraud detection capabilities are stored, retained, or otherwise maintained on the nontransitory storage media 106. In some instances, one or more programs or machine-readable instruction sets may provide statistical analysis capabilities useful for detecting patterns, distributions, and/or frequencies of attributes 146 and attribute values and/or combinations of attributes 146 and attribute values in both historical fraudulent end-user profiles 144 as well as current suspected fraudulent end-user profiles 144. In some instances, one or more programs or machine-readable instruction sets may provide machine learning capabilities for the fraud detection system 104 using both historical fraudulent end-user profiles 144 as well as current suspected fraudulent end-user profiles 144 as training examples. Through statistical analysis and machine learning via known or suspected fraudulent end-user profile 144 training examples, the fraud detection system 104 can screen incoming end-user profiles prior to addition to the end-user data store or database 110 and/or screen the end-user data store or database 110 to detect, remove, or mark for removal existing fraudulent and suspected fraudulent end-user profiles 144.

In some instances, the fraud detection system 104 generates a "score" or other similar valuation for each end-user profile based on the end-user attributes and attribute values and/or combinations of end-user attributes and attribute values associated with the respective end-user profile. In some implementations, the fraud detection system 104 uses the score or other valuation associated with each end-user profile to rank the profile into one of any number of groups. Such groups may include, but are not limited to, groups of end-user profiles classified as: fraudulent, suspected as being fraudulent, suspected as being valid, valid, or requiring additional investigation prior to determination of fraud. In some implementations, such profile scores or valuations may be provided to one or more customer service representatives or organizations for manual follow-up prior to the determination that the respective end-user profile is either a valid end-user profile 124 or a fraudulent end-user profile 144. In some implementations, the fraud detection system 104 may autonomously prevent the storage of known fraudulent end-user profiles 144 in the end-user data store or database 110 and/or may remove known fraudulent end-user profiles 144 from the end-user data store or database.

The fraud detection system 104 includes a query generation sub-system that generates a number of queries based in whole or in part on known or suspected fraudulent end-user attributes 146 and attribute values and/or combinations of known or suspected fraudulent end-user attributes 146 and attribute values. In some instances, the query generation sub-system may be implemented in whole or in part in the form of one or more machine-readable instruction sets executed by the fraud detection system 104.

The fraud detection system 104 additionally includes machine-readable instruction sets 112 that cause the fraud detection system to screen via one or more simple queries and/or one or more compound queries some or all of the incoming end-user profiles for end-user attributes and attribute values and/or combinations of end-user attributes and attribute values that are associated with known or suspected fraudulent end-user profiles 144. Responsive to detecting an incoming known or suspected fraudulent end-user profile 144, the fraud detection system may autonomously reject the known or suspected fraudulent end-user 130 logically associated with the known or suspected fraudulent end-user profile 144.

The machine-readable instruction sets 112 may additionally include one or more screening algorithms that cause the fraud detection system 104 to scan via one or more simple queries and/or one or more compound queries all or a portion of the end-user profiles stored, retained, or otherwise maintained in the end-user data store or database 110 for end-user attributes 146 and attribute values and/or combinations of end-user attributes 146 and attribute values that are associated with known or suspected fraudulent end-user profiles 144. Responsive to detecting a stored known or suspected fraudulent end-user profile 144, the fraud detection system may autonomously quarantine and/or remove the known or suspected fraudulent end-user profile 144 from the end-user data store or database 110.

While FIG. 1 illustrates a representative networked environment 100, typical networked environments may include many additional computer systems and entities. The concepts taught herein may be employed in a similar fashion with more populated networked environments than that illustrated.

Figure 2:
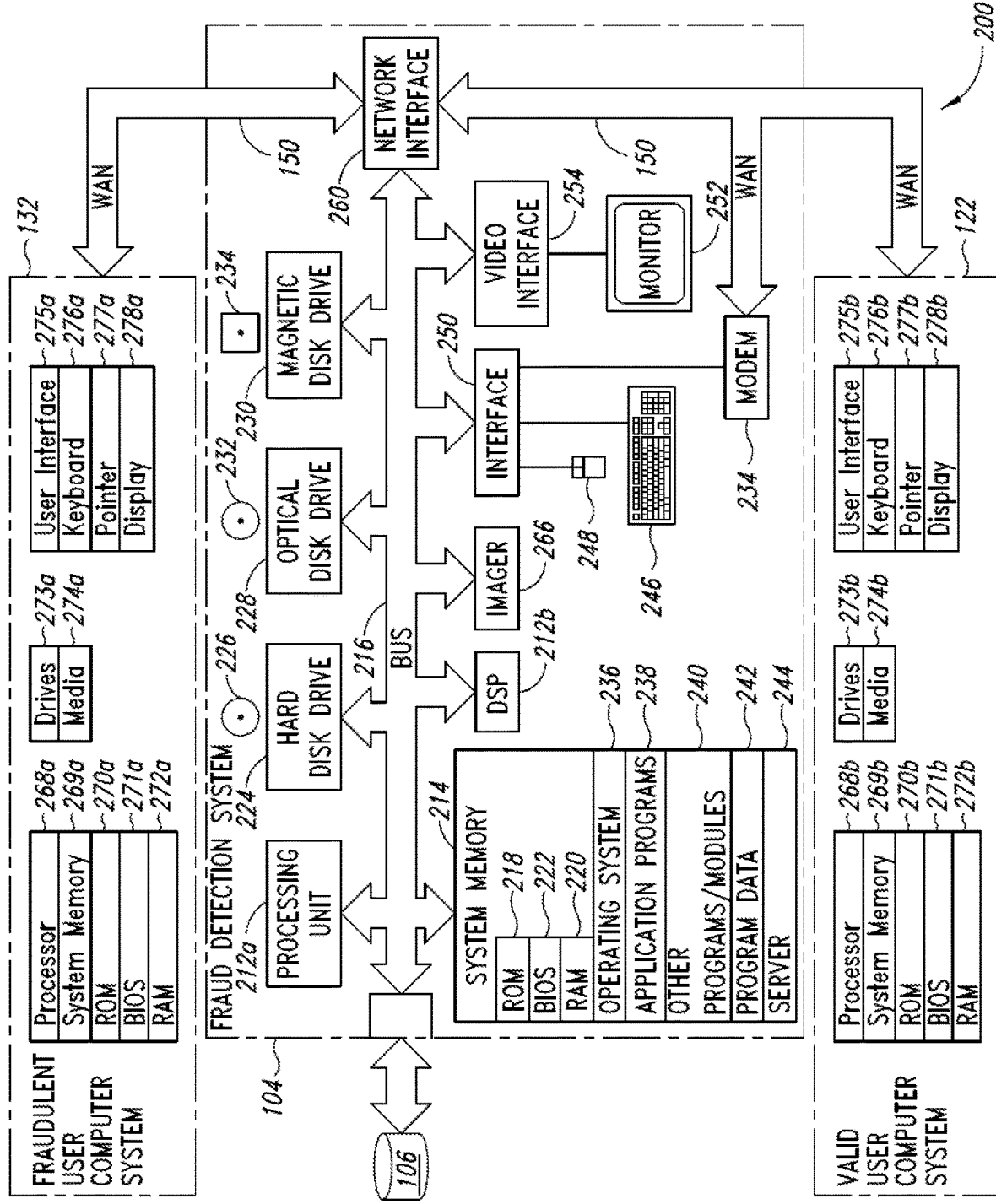
FIG. 2 is a functional block diagram of a fraudulent profile detection system networked to one of the end-user client processor-based devices, according to one illustrated embodiment.

FIG. 2 and the following discussion provide a brief, general description of a suitable networked matching service environment 200 in which the various illustrated fraud detection systems 104 might be implemented. Although not required, the embodiments will be described in the general context of computer-executable instructions, such as program application modules, objects, or macros stored on computer- or processor-readable media and executed by a computer or processor. Those skilled in the relevant art will appreciate that the illustrated embodiments, as well as other embodiments, can be practiced with other system configurations and/or other computing system configurations, including hand-held devices, multiprocessor systems, microprocessor-based or programmable consumer electronics, personal computers ("PCs"), networked PCs, mini computers, mainframe computers, and the like. The embodiments can be practiced in distributed computing environments where tasks or modules are performed by remote processing devices, which are linked through a communications network. In a distributed computing environment, program modules may be located in both local and remote memory storage devices or media.

FIG. 2 shows a networked matching service environment 200 comprising one or more fraud detection systems 104 (only one illustrated) and one or more associated nontransitory machine-readable storage media 106 (only one illustrated). The associated nontransitory computer- or processor-readable storage media 106 is communicatively coupled to the fraud detection system(s) 104 via one or more communications channels, for example one or more parallel cables, serial cables, or wireless network channels capable of high speed communications, for instance via Universal Serial Bus ("USB") 3.0 or via Thunderbolt®.

The networked matching service environment 200 also includes one or more valid end-user processor-based devices 122 (only one illustrated) and one or more fraudulent end-user processor-based devices 132 (only one illustrated). The valid end-user processor-based devices 122 and the fraudulent end-user processor-based devices 132 are communicably coupled to the fraud detection system(s) 104 by one or more communications channels, for example one or more wide area networks (WANs) 150, for instance the Internet using Internet protocols. In operation, the valid end-user processor-based device 122 and the fraudulent end-user processor-based device 132 typically represent one or more valid end-user processor-based devices 122 or one or more fraudulent end-user processor-based devices 132 (e.g., desktop computer, laptop computer, ultraportable computer, tablet computer, smartphone, wearable computer) that are directly communicably coupled or indirectly communicably coupled through the matching system entity 102 to the fraud detection system 104 via the one or more networks 150. Although the fraud detection system 104 is described herein in the context of a standalone system, the fraud detection system 104 may, in fact, constitute only a portion of the matching service entity 102 (e.g., a sub-system installed in or communicably coupled to the matching service entity 102). In such instances, components, sub-systems, and resources described forming a portion of the fraud detection system 104 should be understood as components, sub-systems, and resources that are shared with the matching service entity 102 or one or more common systems and/or resources that are allocated between the fraud detection system(s) 104 by the matching service entity 102.

The networked matching service environment 200 may employ other computer systems and network equipment, for example additional servers, proxy servers, firewalls, routers and/or bridges. The fraud detection system(s) 104 will at times be referred to in the singular herein, but this is not intended to limit the embodiments to a single device since in typical embodiments there may be more than one fraud detection system(s) 104 involved. Unless described otherwise, the construction and operation of the various blocks shown in FIG. 2 are of conventional design. As a result, such blocks need not be described in further detail herein, as they will be understood by those skilled in the relevant art.

The fraud detection system(s) 104 may include one or more processing units 212a, 212b (collectively 212), a system memory 214 and a system bus 216 that couples various system components including the system memory 214 to the processing units 212. The processing units 212 may be any logic processing unit, such as one or more central processing units (CPUs) 212a, digital signal processors (DSPs) 212b, application-specific integrated circuits (ASICs), field programmable gate arrays (FPGAs), etc. The system bus 216 can employ any known bus structures or architectures, including a memory bus with memory controller, a peripheral bus, and/or a local bus. The system memory 214 includes read-only memory ("ROM") 218 and random access memory ("RAM") 220. A basic input/output system ("BIOS") 222, which can form part of the ROM 218, contains basic routines that help transfer information between elements within the fraud detection system 104, such as during start-up.

The fraud detection system 104 may include a hard disk drive 224 for reading from and writing to a hard disk 226, an optical disk drive 228 for reading from and writing to removable optical disks 232, and/or a magnetic disk drive 230 for reading from and writing to magnetic disks 234. The optical disk 232 can be a CD-ROM, while the magnetic disk 234 can be a magnetic floppy disk or diskette. The hard disk drive 224, optical disk drive 228 and magnetic disk drive 230 may communicate with the processing unit 212 via the system bus 216. The hard disk drive 224, optical disk drive 228 and magnetic disk drive 230 may include interfaces or controllers (not shown) coupled between such drives and the system bus 216, as is known by those skilled in the relevant art. The drives 224, 228 and 230, and their associated computer-readable media 226, 232, 234, provide nonvolatile storage of computer-readable instructions, data structures, program modules and other data for the master node server computer system 202. Although the depicted fraud detection system(s) 104 is illustrated employing a hard disk 224, optical disk 228 and magnetic disk 230, those skilled in the relevant art will appreciate that other types of computer-readable media that can store data accessible by a computer may be employed, such as WORM drives, RAID drives, magnetic cassettes, flash memory cards, digital video disks ("DVD"), Bernoulli cartridges, RAMs, ROMs, smart cards, etc.

Program modules can be stored in the system memory 214, such as an operating system 236, one or more application programs 238, other programs or modules 240 and program data 242. Application programs 238 may include instructions that cause the processor(s) 212 to identify attributes 146 and attribute values and/or combinations of attributes 146 and attribute values indicative of known and/or suspected fraudulent end-user profiles 144 using one or more classification systems. In at least some implementations, the fraud detection system 104 may be trained using known historical fraudulent end-user profiles 144 or historical suspected fraudulent end-user profiles 144 to provide a naïve or semi-naïve Bayesian classification system useful for identifying suspected fraudulent end-user profiles 144. In at least some implementations, the end-user attributes 146 included in the analysis of the known historical fraudulent end-user profiles 144 or historical suspected fraudulent end-user profiles 144 includes, but is not limited to: the ISP, the last login operating systems, the password properties of the end-user, end-user processor-based system plugins, end-user gender, end-user email domain information, end-user signup IP domain information, end-user profile details, IP country, the time required to generate the end-user profile, and similar.

Application programs 238 may additionally include one or more machine-readable instruction sets that cause the processor(s) 212 to determine data indicative of one or more aspects of the dissimilarity existent in a set of end-user profiles. The set of end-user profiles may include any number of known fraudulent end-user profiles 146, any number of known valid end-user profiles 126, or any number of known valid end-user profiles 124 and known fraudulent end-user profiles 144. In at least some instances, the processor(s) 212 generate data indicative of a representation of the dissimilarity in a set of end-user profiles using a dissimilarity matrix. In at least some instances, the processor(s) 212 determine the dissimilarity matrix using at least one of: Manhattan distances, Euclidean distances, or Gower coefficients.

Application programs 238 may additionally include one or more machine-readable instruction sets that cause the processor(s) 212 to apply one or more clustering algorithms to a set of valid and/or fraudulent end-user profiles to provide a number of clusters of related valid and/or fraudulent end-user profiles. Each of the number of clusters includes at least one valid or fraudulent end-user profile.

In at least some implementations, the clustering algorithm may include one or more agglomerative clustering algorithms. In at least some implementations, the clustering algorithm may include an agglomerative clustering algorithm that is based at least in part on a determined representation of dissimilarity in the set of valid and/or fraudulent end-user profiles. In at least some implementations, the clustering algorithm may include an agglomerative clustering algorithm that is based at least in part on minimizing an average of dissimilarities between one determined user-profile cluster and another determined user profile cluster. In at least some implementations, the clustering algorithm may include an agglomerative clustering algorithm that is based at least in part on clustering valid and/or fraudulent end-user profiles based at least in part on the dissimilarity matrices of the respective end-user profiles. In some instances, the clustering algorithm performed by the processor(s) 212 may include an agglomerative nesting clustering algorithm that clusters valid and/or fraudulent end-user profiles using at least one of: a nearest neighbor method, a furthest neighbor method, a pair group average method, a centroid method, a median method, and Ward's method. In some instances, the clustering algorithm performed by the processor(s) 212 may include a divisive analysis clustering of valid and/or fraudulent end-user profiles. In some instances, the clustering algorithm performed by the processor(s) 212 may include normalizing the values associated with one or more valid and/or fraudulent end-user attributes and attribute values and/or combinations of valid and/or fraudulent end-user attribute and/or attribute values prior to performing the cluster analysis.

Figure 3:
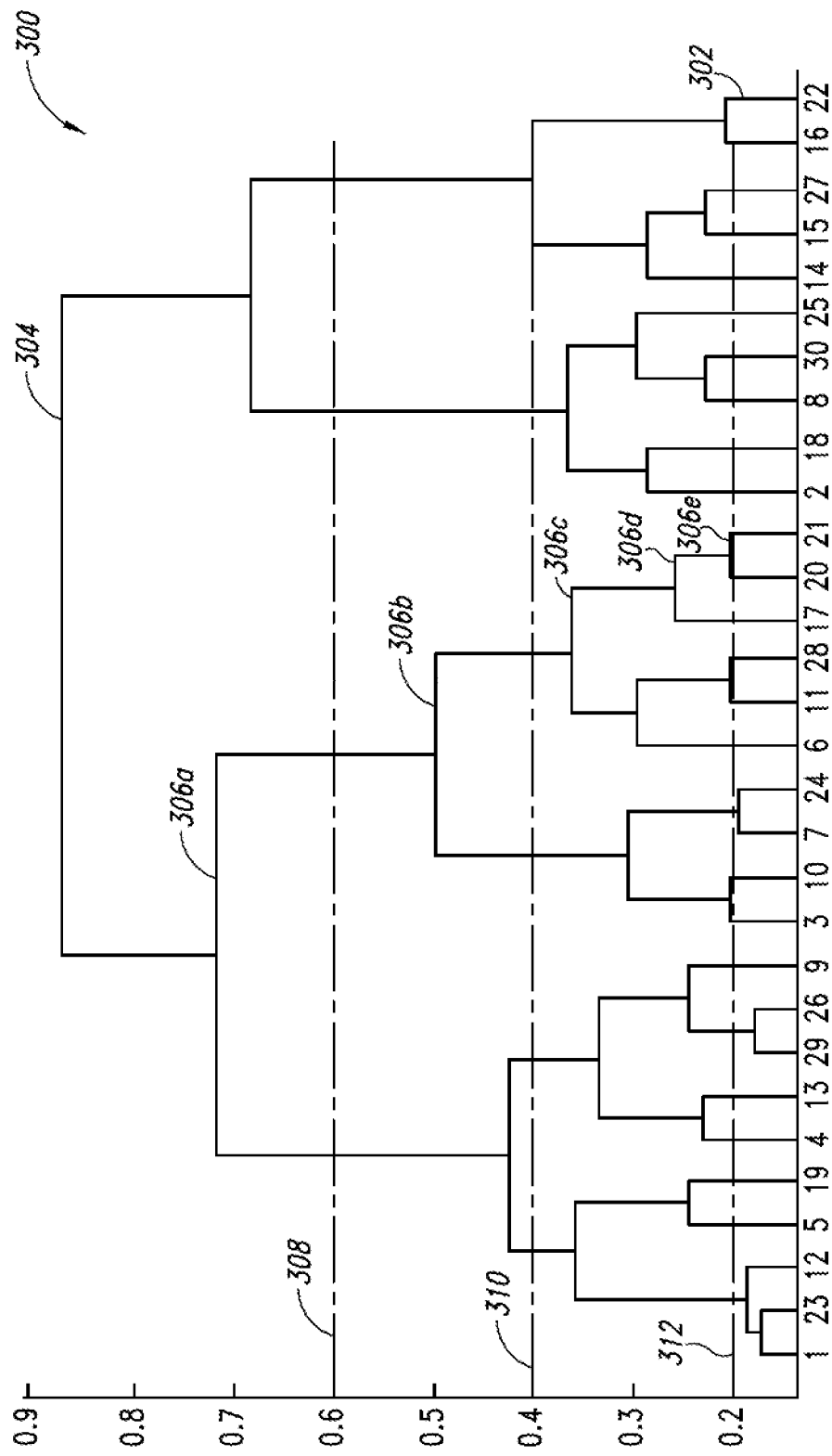
FIG. 3 is a dendrogram illustrating an example method useful for classifying end-user client entities based on one or more defined end-user attributes, according to one illustrated embodiment.

In at least some implementations, the clustering performed by the fraud detection system 104 can provide clustering data in the form of a tree or dendrogram such as the illustrative dendrogram 300 depicted in FIG. 3. In the dendrogram 300, individual end-users 302 are depicted at the bottom and the top 304 includes the entire set of end-users included in the cluster analysis performed by the fraud detection system 104. Between the top and bottom of the dendrogram, end-users are grouped in intermediate level clusters 306a-306e based on the valid and/or fraudulent end-user attributes logically associated with the respective valid and/or fraudulent end-users. Thus, the end-users included in each intermediate level cluster 306 will share a number of similarities. The number of similarities shared by the end-users within a particular cluster tends to decrease towards the top of the dendrogram 300 and tends to increase towards the bottom of the dendrogram 300.

Returning to FIG. 2, application programs 238 may additionally include one or more machine-readable instruction sets that cause the processor(s) 212 to autonomously or semi-autonomously (i.e., at least partially manually) select various clusters resulting from the clustering algorithm as including a number of suspected fraudulent end-user profiles 144. For example, using the dendrogram 300 depicted in FIG. 3, in at least some implementations, the processor(s) 212 can select a horizontal "cut" across the dendrogram 300. Intermediate level clusters 306 falling below the horizontal cut are discarded. Thus, a cut at line 308 provides four clusters, a cut at line 310 provides six clusters, and a cut at line 312 provides twenty-two clusters. Cutting the dendrogram 300 higher (e.g., at 308) results in a fewer number of clusters that include larger numbers of end-users 120, 140 that share relatively smaller number of similarities while cutting the dendrogram 300 lower (e.g., at 312) results in a greater number of clusters that include fewer numbers of valid and/or fraudulent end-users that share a relatively greater number of similarities. Cluster generation and selection algorithms other than the dendrogram discussed in detail above may be substituted.

Application programs 238 may additionally include one or more machine-readable instruction sets that cause the processor(s) 212, in a first pass, to identify respective end-user attribute values and/or combinations of end-user attribute values appearing above a first defined threshold in each of the clusters 306 suspected of including a number of suspected fraudulent end-user profiles 144. In at least some implementations, end-user attribute values and/or combinations of end-user attribute values occurring within a cluster 306 at a frequency above a first defined threshold (e.g., greater than "x" percent of the population of the respective cluster) are flagged or otherwise identified by the processor(s) 212 as indicative of the existence of a fraudulent end-user profile 144. In at least some implementations, the processor(s) 212 use one or more algorithms to perform, at least in part, the depth-first search for frequent end-user attribute values and/or combinations of end-user attribute values that occur with a frequency exceeding the first defined threshold (i.e., the "support threshold") in the subset of valid and/or fraudulent end-user profiles included in each of the clusters 306. The algorithm used by the processor(s) 212 to perform the depth-first search for frequent end-user attribute values and/or combinations of end-user attribute values that occur with a frequency exceeding the first defined threshold can include at least one of: an Eclat algorithm, an Apriori algorithm, an FP-growth algorithm, a GUHA Procedure ASSOC, or an OPUS search.

Application programs 238 may additionally include one or more machine-readable instruction sets that cause the processor(s) 212, in a second pass, to identify additional end-user attribute values and/or combinations of end-user attribute values appearing in the end-user attributes identified in the first pass and occurring with a frequency above a second defined threshold in each of the clusters 306. In at least some implementations, end-user attribute values and/or combinations of end-user attribute values occurring within a cluster 306 at a frequency above a second defined threshold (e.g., greater than "y" percent of the population of the respective cluster) are flagged or otherwise identified by the processor(s) 212 as indicative of the existence of a fraudulent end-user profile 144. In at least some implementations, the processor(s) use an algorithm to perform, at least in part, the search for frequent end-user attribute values and/or combinations of end-user attribute values that occur with a frequency exceeding the second defined threshold (i.e., the "combine threshold") in the subset of fraudulent and or suspected fraudulent end-user profiles included in each of the clusters 306.

Application programs 238 may additionally include one or more machine-readable instruction sets that cause the processor(s) 212, in a second pass, to generate one or more queries to identify fraudulent or suspected fraudulent end-user profiles 144 based on the presence of end-user attribute values 146 and/or combinations of end-user attribute values 146 identified in the first and second pass analyses appearing in the respective end-user profile 144. Application programs 238 may additionally include one or more machine-readable instruction sets that cause the processor(s) 212 to combine one or more queries into a single compound query to identify fraudulent end-user profiles 144 based at least in part on the presence of including fraudulent end-user attributes 146 and attribute values and/or combinations of fraudulent end-user attributes 146 and attribute values.

In at least some implementations, the processor(s) 212 may run one or more queries against incoming or newly received end-user profiles to identify those end-user profiles including attribute values indicative of a fraudulent end-user profile or a suspected fraudulent end-user profile prior to adding the end-user profile to the end-user data store or database 110. In at least some implementations, the processor(s) 212 may run one or more queries against the valid and/or fraudulent end-user profiles included in the end-user data store or database 110 to identify fraudulent end-user profiles 144 based at least in part on the presence of including fraudulent end-user attributes 146 and attribute values and/or combinations of fraudulent end-user attributes 146 and attribute values.

While shown in FIG. 2 as being stored in the system memory 214, the operating system 236, application programs 238, other programs/modules 240, program data 242 and browser 244 can be stored on the hard disk 226 of the hard disk drive 224, the optical disk 232 of the optical disk drive 228 and/or the magnetic disk 234 of the magnetic disk drive 230.

An operator can enter commands and information into the fraud detection system 104 through input devices such as a touch screen or keyboard 246 and/or a pointing device such as a mouse 248, and/or via a graphical user interface. Other input devices can include a microphone, joystick, game pad, tablet, scanner, etc. These and other input devices are connected to one or more of the processing units 212 through an interface 250 such as a serial port interface that couples to the system bus 216, although other interfaces such as a parallel port, a game port or a wireless interface or a universal serial bus ("USB") can be used. A monitor 252 or other display device is coupled to the system bus 216 via a video interface 254, such as a video adapter. The fraud detection system(s) 104 can include other output devices, such as speakers, printers, etc.

The fraud detection system(s) 104 can operate in a networked environment using logical connections to one or more remote computers and/or devices. For example, the fraud detection system(s) 104 can operate in a networked environment using logical connections to one or more valid end-user processor-based devices 122 and to one or more fraudulent end-user processor-based devices 132. Communications may be via tethered, wired, and/or wireless network architecture, for instance wired and wireless enterprise-wide computer networks, intranets, extranets, and/or the Internet. Other embodiments may include other types of communications networks including telecommunications networks, cellular networks, paging networks, and other mobile networks. There may be any variety of computers, switching devices, routers, bridges, firewalls and other devices in the communications paths between the fraud detection system(s) 104, the one or more valid end-user processor-based devices 122 and the one or more fraudulent end-user processor-based devices 132.

The one or more valid end-user processor-based devices 122 and the one or more fraudulent end-user processor-based devices 132 typically take the form of end-user processor-based devices, for instance personal computers (e.g., desktop or laptop computers), netbook computers, tablet computers, smartphones, portable computers, wearable computers, and other processor-based devices capable of executing machine-readable instruction sets. These end-user processor-based devices may be communicatively coupled to one or more routers and/or one or more server computers. For instance, the end-user processor-based devices 122, 132 may be communicatively coupled through one or more firewalls to an Internet Service Provider or ISP.

The valid end-user processor-based devices 122 and the fraudulent end-user processor-based devices 132 may include one or more processing units 268a, 268b (collectively 268), system memories 269a, 269b (collectively 269) and a system bus (not shown) that couples various system components including the system memory 269 to the processing unit 268. The valid end-user processor-based devices 122 and the fraudulent end-user processor-based devices 132 will at times each be referred to in the singular herein, but this is not intended to limit the embodiments to a single valid end-user processor-based device 122 and/or a single fraudulent end-user processor-based device 132. In typical embodiments, there will likely be a large number of valid end-user processor-based devices 122 and there may be more than one fraudulent end-user processor-based devices 132.

The processing unit 268 may be any logic processing unit, such as one or more central processing units (CPUs), digital signal processors (DSPs), application-specific integrated circuits (ASICs), field programmable gate arrays (FPGAs), etc. Non-limiting examples of commercially available computer systems include, but are not limited to, the Celeron, Core, Core 2, Itanium, and Xeon families of microprocessors offered by Intel® Corporation, U.S.A.; the K8, K10, Bulldozer, and Bobcat series microprocessors offered by Advanced Micro Devices, U.S.A.; the A5, A6, and A7 series microprocessors offered by Apple Computer, U.S.A.; the Snapdragon series microprocessors offered by Qualcomm, Inc., U.S.A.; and the SPARC series microprocessors offered by Oracle Corp., U.S.A. Unless described otherwise, the construction and operation of the various blocks of the end-user processor based devices 122, 132 shown in FIG. 2 are of conventional design. As a result, such blocks need not be described in further detail herein, as they will be understood by those skilled in the relevant art.

The system bus can employ any known bus structures or architectures, including a memory bus with memory controller, a peripheral bus, and a local bus. The system memory 269 includes read-only memory ("ROM") 270a, 270b (collectively 270) and random access memory ("RAM") 272a, 272b (collectively 272). A basic input/output system ("BIOS") 271a, 271b (collectively 271), which can form part of the ROM 270, contains basic routines that help transfer information between elements within the end-user computer systems 206, 208, such as during start-up.

The valid end-user processor-based devices 122 and the fraudulent end-user processor-based devices 132 may also include one or more media drives 273a, 273b (collectively 273), e.g., a hard disk drive, magnetic disk drive, WORM drive, and/or optical disk drive, for reading from and writing to computer-readable storage media 274a, 274b (collectively 274), e.g., hard disk, optical disks, and/or magnetic disks. The computer-readable storage media 274 may, for example, take the form of removable media. For example, hard disks may take the form of a Winchester drives, and optical disks can take the form of CD-ROMs, while magnetic disks can take the form of magnetic floppy disks or diskettes. The media drive(s) 273 communicate with the processing unit 268 via one or more system buses. The media drives 273 may include interfaces or controllers (not shown) coupled between such drives and the system bus, as is known by those skilled in the relevant art. The media drives 273, and their associated computer-readable storage media 274, provide nonvolatile storage of computer readable instructions, data structures, program modules and other data for the fraudulent end-user processor-based devices 132 and/or the valid end-user processor-based devices 122. Although described as employing computer-readable storage media 274 such as hard disks, optical disks and magnetic disks, those skilled in the relevant art will appreciate that end-user computer systems 206, 208 may employ other types of computer-readable storage media that can store data accessible by a computer, such as magnetic cassettes, flash memory cards, digital video disks ("DVD"), Bernoulli cartridges, RAMs, ROMs, smart cards, etc. Data or information, for example, electronic or digital documents or files or data (e.g., metadata, ownership, authorizations) related to such can be stored in the computer-readable storage media 274.

Program modules, such as an operating system, one or more application programs, other programs or modules and program data, can be stored in the system memory 269. Program modules may include instructions for accessing a Website, extranet site or other site or services (e.g., Web services) and associated WebPages, other pages, screens or services hosted by the insurance management system 102. Program modules may include instructions for storing certain or selected electronic correspondence and/or electronic or digital documents or files or changes thereto to nontransitory computer- or processor readable storage medium, such as local media 274a, 274b. Alternatively, the instructions may cause retrieval of electronic correspondence and/or electronic or digital documents or files or changes to existing electronic correspondence and/or electronic or digital documents or files. Program modules may additionally include instructions for handling security such as ownership, password or other access protection and communications encryption.

The system memory 269 may also include other communications programs, for example a Web client or browser that permits the valid end-user processor-based devices 122 and the fraudulent end-user processor-based devices 132 to access and exchange data with sources such as Web sites of the Internet, corporate intranets, extranets, or other networks. The browser may, for example be markup language based, such as Hypertext Markup Language (HTML), Extensible Markup Language (XML) or Wireless Markup Language (WML), and may operate with markup languages that use syntactically delimited characters added to the data of a document to represent the structure of the document.

While described as being stored in the system memory 269, the operating system, application programs, other programs/modules, program data and/or browser can be stored on the computer-readable storage media 274 of the media drive(s) 273. An operator can enter commands and information into the fraudulent end-user processor-based devices 132 and the valid end-user processor-based devices 122 via a user interface 275a, 275b (collectively 275) through input devices such as a touch screen or keyboard 276a, 276b (collectively 276) and/or a pointing device 277a, 277b (collectively 277) such as a mouse. Other input devices can include a microphone, joystick, game pad, tablet, scanner, etc. These and other input devices are connected to the processing unit 269 through an interface such as a serial port interface that couples to the system bus, although other interfaces such as a parallel port, a game port or a wireless interface or a universal serial bus ("USB") can be used. A display or monitor 278a, 278b (collectively 278) may be coupled to the system bus via a video interface, such as a video adapter. The satellite node server computer system 206 can include other output devices, such as speakers, printers, etc.

Figure 4:
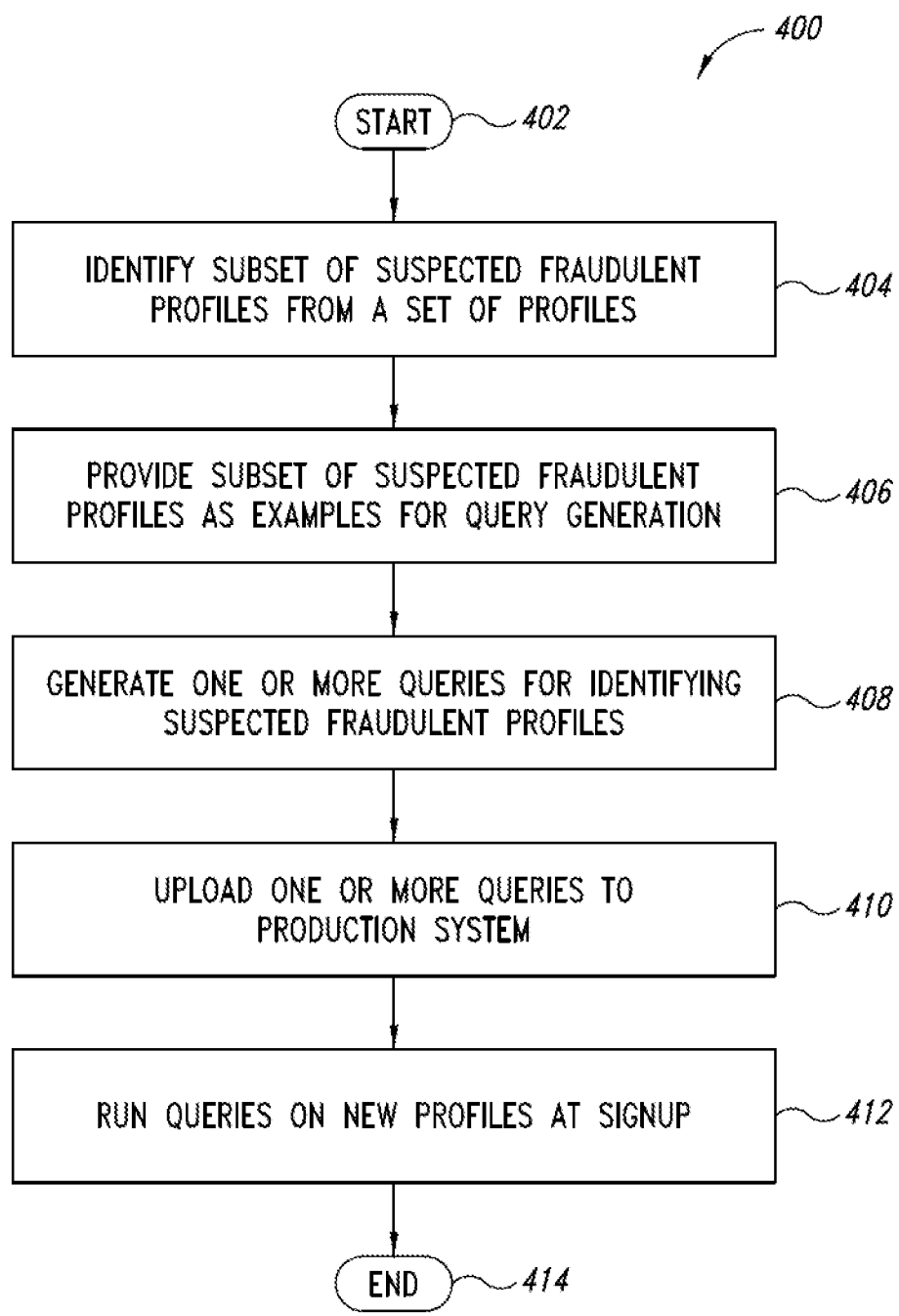
FIG. 4 is a flow diagram showing a high-level method of generating queries for use in a fraudulent profile detection system to detect client profiles meeting one or more fraudulent or otherwise undesirable profile characteristics, according to one illustrated embodiment.

FIG. 4 shows a high-level method 400 of generating queries for identifying fraudulent end-user profiles 144 and suspected fraudulent end-user profiles 144 by a fraud detection system 104 such as that described in detail with regard to FIGS. 1-3, according to one illustrated embodiment. In at least some implementations, the fraud detection system 104 can autonomously, semi-autonomously, or manually identify any number of known fraudulent end-user profiles 144 and any number of suspected fraudulent end-user profiles 144. Each of the identified fraudulent and suspected fraudulent end-user profiles 144 include any number of logically associated attributes 146, each having at least one attribute value associated therewith. Using the attributes 146 and attribute values logically associated with the identified fraudulent and suspected fraudulent end-user profiles 144 as training examples, the fraud detection system 104 autonomously generates or semi-autonomously generates (e.g., autonomously generates queries that are approved by a customer service representative) a number of queries, each of which can be run against either an incoming or stored end-user profile to determine whether the attributes and attribute values included in the profile are indicative of a fraudulent end-user profile 144 or are indicative of a valid end-user profile 124. The method of generating queries for identifying fraudulent end-user profiles 144 and suspected fraudulent end-user profiles 144 by a fraud detection system 104 commences at 402.

At 404, the fraud detection system 104 identifies a subset of fraudulent end-user profiles 144 and/or suspected fraudulent end-user profiles 144 from a larger set of end-user profiles that may contain both valid end-user profiles 124 and fraudulent end-user profiles 144. In some instances, the identification of the subset of fraudulent end-user profiles 144 and/or suspected fraudulent end-user profiles 144 is performed manually, for example by a customer service representative or other system user who manually identifies those end-user profiles that are either fraudulent end-user profiles 144 and/or suspected fraudulent end-user profiles 144. In other instances, the identification of the subset of fraudulent end-user profiles 144 and/or suspected fraudulent end-user profiles 144 is performed autonomously by the fraud detection system 104. In yet other instances, the fraud detection system 104 may identify those end-user profiles included in the subset of fraudulent end-user profiles 144 and/or suspected fraudulent end-user profiles 144 for verification by a customer service representative or other authorized system user prior to using the subset of fraudulent end-user profiles 144 and/or suspected fraudulent end-user profiles 144 in generating one or more queries.

At 406, the fraud detection system 104 provides the fraudulent end-user profiles 144 and/or suspected fraudulent end-user profiles 144 included in the subset to one or more query generation sub-systems. Advantageously, as new fraudulent end-user profiles 144 are received and identified, such profiles are provided to the query generation sub-system for incorporation into algorithms capable of producing new or additional queries that are able to identify and address the threat posed by these new fraudulent end-user profiles 144. Such a system thereby provides ongoing identification and removal of fraudulent end-user profiles 144.

At 408, using the fraudulent end-user profiles 144 and/or suspected fraudulent end-user profiles 144 included in the subset, the query generation sub-system determines fraudulent end-user attributes and attribute values and combinations of fraudulent end-user attributes and attribute values that appear with a frequency above a defined threshold in the number of the fraudulent end-user profiles 144 and/or suspected fraudulent end-user profiles 144 included in the subset.

In at least some instances, the query generation sub-system may generate data indicative of such queries based on one or more passes through the subset of fraudulent end-user profiles 144 and/or suspected fraudulent end-user profiles 144. For example, the query generation sub-system may perform a first pass that identifies the attribute value "Richmond, VA" associated with the end-user attribute of "end-user location" as appearing with a frequency greater than a first defined threshold (e.g., greater than 30%, 40%, 50%, 60%, or 70% of the end-user profiles included in one or more clusters) in a number of end-user profiles included in a single cluster. In such an instance might contain a pseudocode query such as "end-user location=Richmond, VA" to identify end-user profiles that include an attribute value of "Richmond, VA" associated with the end-user attribute "end-user location."

At 410, the queries generated by the query generation sub-system are uploaded to the production fraud detection system 104.

At 412, as new end-user profiles are received by the match service entity 102, the fraud detection system 104 can run one or more queries against new end-user profiles as they are received by the match service entity 102. In some instances, the fraud detection system 104 may generate a score or other valuation that provides an indication of whether the respective end-user profile represents a fraudulent end-user profile 144, a valid end-user profile 124, or an end-user profile requiring additional investigation prior to making a validity determination. In other instances, the fraud detection system 104 can autonomously prevent the addition of fraudulent end-user information to the end-user data store or database 110. The method of generating queries for identifying fraudulent end-user profiles 144 and suspected fraudulent end-user profiles 144 by a fraud detection system 104 concludes at 414.

Figure 5:
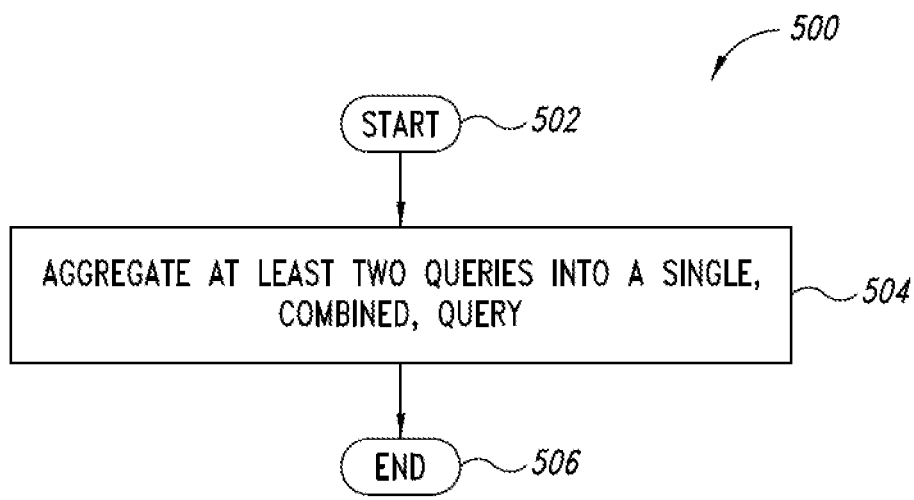
FIG. 5 is a flow diagram showing a low-level method of generating a compound query that includes at least two individual queries for use by a fraud detections system to detect suspected fraudulent or otherwise undesirable end-user profiles, according to one illustrated embodiment.

FIG. 5 shows a high-level method 500 of aggregating two or more queries for identifying fraudulent end-user profiles 144 and suspected fraudulent end-user profiles 144 by a fraud detection system 104 such as that described in detail with regard to FIGS. 1-3, according to one illustrated embodiment. In at least some implementations, the fraud detection system 104 may combine or otherwise aggregate two or more queries into a single query to determine at signup whether a new end-user profile is a suspected fraudulent end-user profile 144. By combining or aggregating two or more queries into a single query, the fraud detection system is advantageously able to more accurately distinguish valid end-user profiles 124 from fraudulent end-user profiles 144. The low-level method 500 of running a combined or aggregate query that includes two or more queries against an end-user profile to determine whether the end-user profile is a fraudulent end-user profile 144 or a suspected fraudulent end-user profile 144 may be employed as part of, or in addition to, the high level method 400 (FIG. 4). The method 500 of generating two or more combined or aggregated queries for identifying fraudulent end-user profiles 144 and suspected fraudulent end-user profiles 144 by a fraud detection system 104 commences at 502.

At 504, the query generation sub-system generates one or more additional queries using subsequent passes through the subset of fraudulent end-user profiles 144 and/or suspected fraudulent end-user profiles 144. In one instance, the query generation sub-system may generate an additional query based on another end-user attribute value that exceeds a second defined threshold (e.g., greater than 30%, 40%, 50%, 60%, or 70% of the end-user profiles included in one or more clusters). Continuing with the example in FIG. 4, the query generation sub-system may identify the attribute value "female" associated with the attribute "end-user gender" as appearing in fraudulent or suspected fraudulent end-user profiles 144 with a frequency greater than a second defined threshold (e.g., greater than 30%, 40%, 50%, 60%, or 70% of the end-user profiles included in one or more clusters). In such an instance, the query generation sub-system may provide a combined or compound pseudocode query such as, "end-user location=Richmond, VA AND end-user gender=female" to identify end-user profiles having an attribute value of "Richmond, VA" associated with the end-user attribute "end-user location" and an attribute value of "female" associated with the end-user attribute "end-user gender."

In another example, again continuing with the example in FIG. 4, the query generation sub-system may, on occasion, perform a second pass specifically directed to the end-user attribute "end-user location" that identifies the attribute value "Petersburg, VA" as appearing in fraudulent or suspected fraudulent end-user profiles 144 with a frequency greater than a second defined threshold (e.g., greater than 30%, 40%, 50%, 60%, or 70% of the end-user profiles included in one or more clusters). In such an instance, the query generation sub-system may provide a combined or compound pseudocode query such as, "end-user location=Richmond, VA OR Petersburg, VA" to identify end-user profiles having the attribute value of "Richmond, VA" or "Petersburg, VA" associated with the end-user attribute "end-user location." The method of generating two or more combined or aggregated queries for identifying fraudulent end-user profiles 144 and suspected fraudulent end-user profiles 144 by a fraud detection system 104 concludes at 506.

Figure 6:
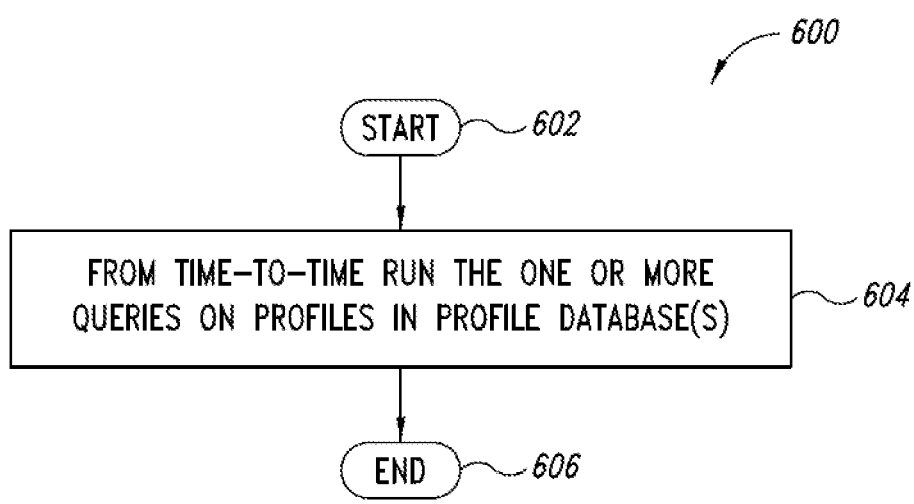
FIG. 6 is a flow diagram showing a low-level method of detecting fraudulent end-user profiles present in an end-user database of a matching service system, according to one illustrated embodiment.

FIG. 6 shows a low-level method 600 of generating running by a fraud detection system 104 one or more queries against the one or more end-user data stores or databases 110 to identify fraudulent end-user profiles 144 and suspected fraudulent end-user profiles 144 in the end-user data store or database 110, according to one illustrated embodiment.

In at least some implementations, the fraud detection system 104 run one or more queries provided by the query generation sub-system against all or a portion of the valid end-user profiles 124 and/or fraudulent end-user profiles 144 stored, retained, or otherwise maintained in the end-user data store or database 110. Running queries against the valid end-user profiles 124 and/or fraudulent end-user profiles 144 included in the data store or database 110 advantageously provides for the ongoing detection and removal from the data store or database 110 of those end-user profiles that include attributes and attribute values and/or combinations of attributes and attribute values indicative of fraudulent end-user profiles 144 and suspected fraudulent end-user profiles 144. The low-level method 600 of running one or more queries against some or all of the end-user profiles included in one or more end-user data stores or databases 110 may be employed as part of, or in addition to, the high level method 400 (FIG. 4). The method 600 of running one or more queries against the one or more end-user data stores or databases 110 to identify fraudulent end-user profiles 144 and suspected fraudulent end-user profiles 144 included in the data store or database commences at 602.

At 604, the fraud detection system 104 runs one or more queries generated by the query generation sub-system against some or all of the valid end-user profiles 124 and/or fraudulent end-user profiles 144 that are stored, retained, or otherwise maintained in the one or more end-user profile data stores or databases 110. In some instances, queries may be run against some or all of the valid end-user profiles 124 and fraudulent end-user profiles 144 that are stored, retained, or otherwise maintained in the one or more end-user profile data stores or databases 110 on a defined schedule or at defined intervals. In some instances, queries may be run against some or all of the valid end-user profiles 124 and/or fraudulent end-user profiles 144 that are stored, retained, or otherwise maintained in the one or more end-user profile data stores or databases 110 at discretionary intervals selected by one or more matching service entity 102 system users and/or administrators. The method of running one or more queries against the one or more end-user data stores or databases 110 to identify fraudulent end-user profiles 144 and suspected fraudulent end-user profiles 144 included in the data store or database concludes at 606.

Figure 7:
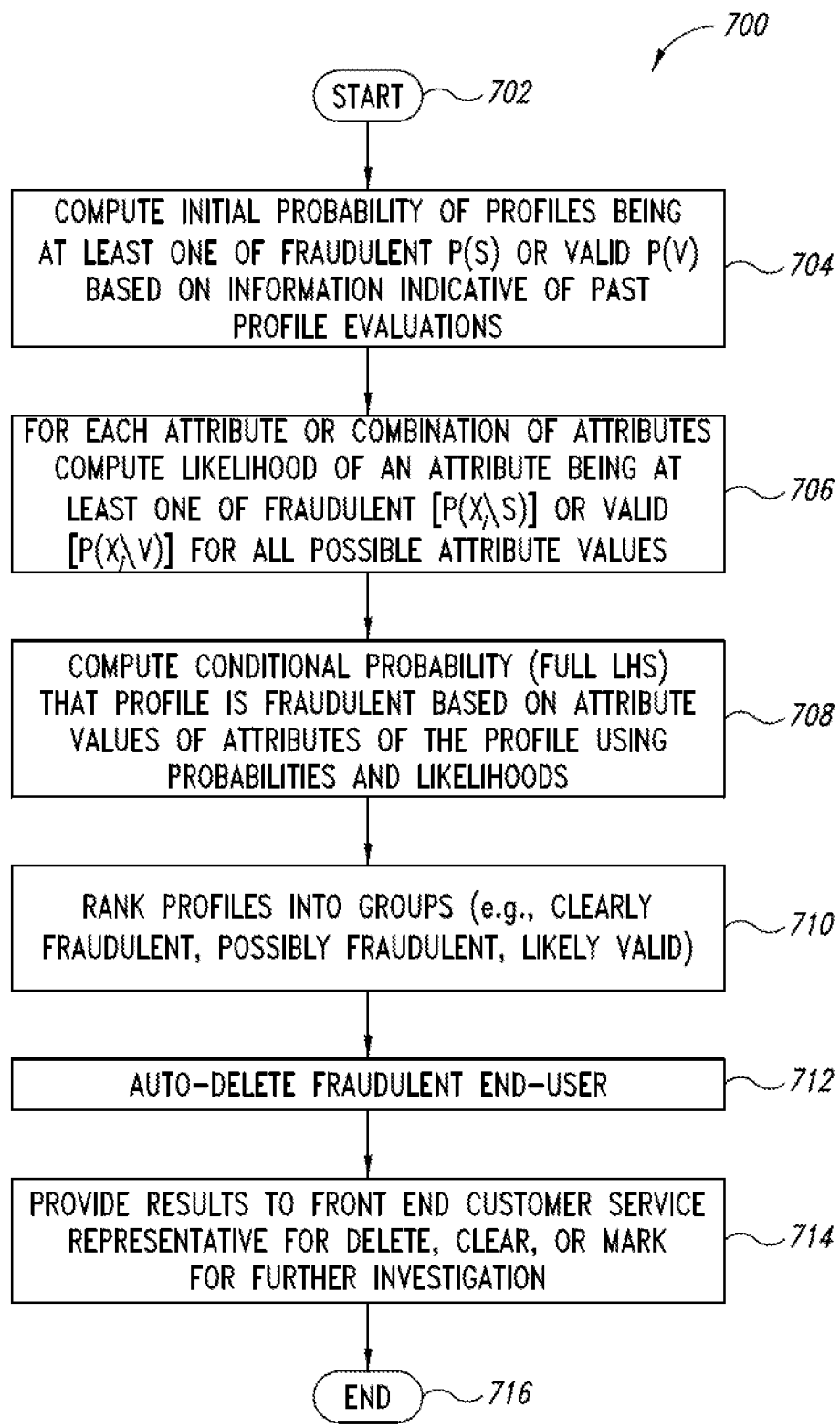
FIG. 7 is a flow diagram showing a low-level method of detecting suspected fraudulent or otherwise undesirable end-user profiles based on an attributes and attribute values logically associated with an end-user profile provided to a matching service system, according to one illustrated embodiment.

FIG. 7 shows a low-level method 700 of determining the probability that an end-user profile included in a set of end-user profiles is either of a fraudulent end-user profile 144 or suspected fraudulent end-user profile 144, according to one illustrated embodiment. The low level method 700 of determining the probability that an end-user profile is a fraudulent end-user profile 144 or a suspected fraudulent end-user profile 144 may be employed as part of, or in addition to, the high level method 400 (FIG. 4). The method 700 of determining the probability that an end-user profile included in a set of end-user profiles is either of a fraudulent end-user profile 144 or suspected fraudulent end-user profile 144 commences at 702.

At 704, the fraud detection system 104 computes values indicative of the initial probability (p(V)) that an end-user profile is a valid end-user profile 124 or the initial probability (p(S)) that an end-user profile is a fraudulent end-user profile 144. In some instances, the probabilities p(V) and p(S) are determined based on a population of end-user profiles accumulated over a defined time period (last 3 months, last 6 months, last 12 months, etc.). In other instances, the probabilities p(V) and p(S) are determined based on a fixed population of end-user profiles (100 end-user profiles, 1000 end-user profiles, 10,000 end-user profiles, etc.) selected either at random or using a defined selection process. Within the selected population, the probability that a given end-user profile is valid is given by:

$$p(V) = \frac{\text{(number of valid end user profiles in population)}}{\text{(total number of end user profiles in population)}} \quad (1)$$

Within the selected population, the probability that a given end-user profile is fraudulent is given by:

$$p(S) = \frac{\text{(number of fraudulent end user profiles in population)}}{\text{(total number of end user profiles in population)}} \quad (2)$$

At 706, for each attribute value or combination of attribute values ($x_i$) included in each valid end-user profile 124 and in each fraudulent end-user profile 144, the fraud detection system 104 determines the likelihood that the particular attribute value or combination of attribute values will appear. Within the selected population, the likelihood that an attribute value or combination of attribute values ($x_i$) is included appears in a valid end-user profile 124 is given by:

$$p(x_i \mid V) = \frac{\text{(\# of valid end user profiles with attribute } x_i\text{)}}{\text{(total number of valid end user profiles in population)}} \quad (3)$$

Within the selected population, the likelihood that an attribute value or combination of attribute values ($x_i$) is included or appears in a fraudulent end-user profile 144 is given by:

$$p(x_i \mid S) = \frac{\text{(\# of fraudulent end user profiles with attribute } x_i\text{)}}{\text{(total number of fraudulent end user profiles in population)}} \quad (4)$$

At 708, the fraud detection system determines a value indicative of a conditional probability that a respective end-user profile is fraudulent using:

$$p(S \mid \{x_i\}) = \frac{p(S) \prod_i^M p(x_i \mid S)}{p(S) \prod_i^M p(x_i \mid S) + p(V) \prod_i^M p(x_i \mid V)} \quad (5)$$

Where $\{x_i\}$ includes all possible attribute values and M represents the total number of possible attribute values for the attributes logically associated with an end-user profile in the matching service entity 102. Where $\{x_i\}$ includes only single attribute values, the conditional probability determined by equation (5) represents a naïve Bayesian system. The conditional probability generated by the fraud detection system 104 can provide a score or valuation of a particular end-user profile, thereby providing an indication of the likelihood that the respective user profile is fraudulent.

Advantageously, the determination of a value indicative of a conditional probability that a respective end-user profile is fraudulent as determined using equation (5) above may be performed repeatedly across some or all of the population of end-user attribute value data stored, retained, or otherwise maintained in the data store or database 110. Such determination of a value indicative of a conditional probability that a respective end-user profile is fraudulent may be initiated at regular or defined intervals (every 4 hours, daily, weekly, etc.), at uneven intervals, and/or manually by a matching service entity 102 administrator. By repeating the determination of a value indicative of a conditional probability that a respective end-user profile is fraudulent, the fraud detection system is able to quickly respond to changes in the attribute values appearing in fraudulent end-user profiles 144. For example, if a fraudulent end-user 130 has recently generated a number of fraudulent end-user profiles 144 on a processor-based device 132 using the Linux operating system, the conditional probability value that a given end-user profile is fraudulent given by equation (5) will increase for those end-users connected to the matching service entity 102 via a processor-based device 122, 132 using the Linux operating system. The conditional probability determined using equation (5) is therefore beneficially indicative of changes in both valid end-user and fraudulent end-user behavior on a real-time or near real-time basis.

In at least some instances, a single attribute value may be logically associated with only valid end-users 120 or fraudulent end-users 130. In such instances, a naïve Bayesian system encountering a profile containing the single attribute value or combination of attribute values will always be identified as either valid or fraudulent, creating a tautology. To avoid this result, where an attribute value is found logically associated with only valid end-users 120 or fraudulent end-users 130, a fractional end-user value is added to the attribute value, thereby avoiding the 100% valid or 100% fraudulent conditional probability determination and permitting the fraud detection system 104 to consider these attribute values in future conditional probability determination cycles. The value of the fractional end-user added to the population in such instances is determined on an attribute-by-attribute basis.

At 710, the fraud detection system 104 ranks each end-user profile into one of a number of groups based at least in part on the conditional probability score or valuation associated with the end-user profile. In some instances, the end-user profiles are ranked upon creation and prior to addition to the end-user data store or database 110. In some instances, all or a portion of the end-user profiles in the end-user data store or database 110 are ranked using the most recently determined conditional probability information.

The end-user profiles may be ranked into any number of groups based on the determined conditional probability that the end-user profile is fraudulent. For example, in one implementation each end-user profile may be classified into one of the following groups based in whole or in part on the determined conditional probability that the respective end-user profile is fraudulent: a clearly fraudulent end-user profile that is automatically deleted from the end-user database 110 or automatically not added to the end-user database 110 by the fraud detection system 104; a suspicious or potentially fraudulent end-user profile that is forwarded by the fraud detection system 104 for further manual review and/or confirmation prior to deletion from the end-user database 110 (existing end-user profiles) or addition to the end-user database 110 (new end-user profiles); and, a likely valid end-user profile that is retained in the end-user database 110 (existing end-user profiles) or added to the end-user database 110 (new end-user profiles). At 712, the fraud detection system 104 autonomously deletes end-user profiles logically associated with identified fraudulent end-users 130.

At 714, the fraud detection system 104 autonomously transfers data indicative of those end-user profiles identified as suspected of being fraudulent end-user profiles 144 at 710 to a customer service representative for manual review and confirmation. In some instances, the customer service representative can manually delete suspected fraudulent end-user profiles 144 after confirmation that the end-user profile is fraudulent. In some instances, the customer service representative can manually clear suspected fraudulent end-user profiles 144 after confirmation that the end-user profile is valid. In some instances, the customer service representative can forward suspected fraudulent end-user profiles 144 for additional review. The method 700 of determining the conditional probability that an end-user profile included in a set of end-user profiles is a fraudulent end-user profile 144 or suspected fraudulent end-user profile 144 concludes at 716.

Figure 8:
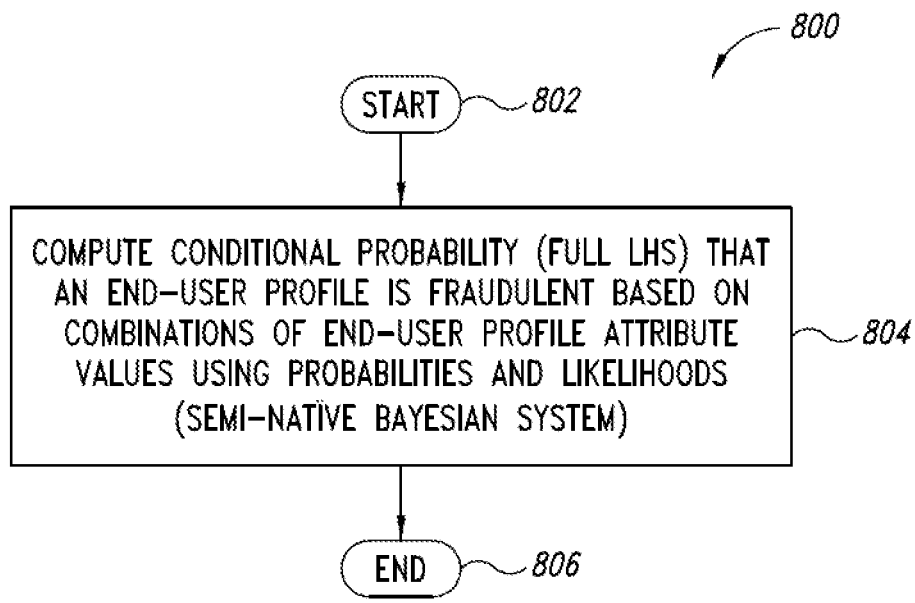
FIG. 8 is a flow diagram showing a low-level method of determining a score or valuation indicative of the likelihood that an end-user profile is logically associated with a fraudulent or otherwise undesirable end-user based on the end-user attributes and attribute values associated with the profile, according to one illustrated embodiment.

FIG. 8 shows a low-level method 800 of determining the conditional probability that an end-user profile is either of a fraudulent end-user profile 144 or suspected fraudulent end-user profile 144 using a combination of attribute values in a semi-naïve Bayesian system, according to one illustrated embodiment. The low level method 800 of determining the probability that an end-user profile is a fraudulent end-user profile 144 or a suspected fraudulent end-user profile 144 using a combination of attribute values in a semi-naïve Bayesian system may be employed as part of, or in addition to, the low level method 700 (discussed in detail with regard to FIG. 7). The method 800 of determining the probability that an end-user profile is a fraudulent end-user profile 144 or a suspected fraudulent end-user profile 144 using a combination of attribute values in a semi-naïve Bayesian system commences at 802.

At 804, the fraud detection system determines a value indicative of a conditional probability that a respective end-user profile is fraudulent using:

$$p(S \mid \{x_i\}) = \frac{p(S)\prod_i^M p(x_i \mid S)}{p(S)\prod_i^M p(x_i \mid S) + p(V)\prod_i^M p(x_i \mid V)} \quad (6)$$

Where $\{x_i\}$ includes all possible attribute values and/or combinations of attribute values and M represents the total number of possible attribute values and/or combination of attribute values for the attributes logically associated with an end-user profile in the matching service entity 102. Where $\{x_i\}$ represents both attribute values and combinations of attribute values, the conditional probability determined by equation (6) represents a semi-naïve Bayesian system. Generally, a greater level of confidence is placed in the conditional probability determined for a semi-naïve Bayesian system over a naïve Bayesian system. The conditional probability generated by the fraud detection system 104 can provide a score or valuation of a particular end-user profile, thereby providing an indication of the likelihood that the respective user profile is fraudulent.

Surprisingly and advantageously, it has been found that fraudulent end-user profiles 124 typically contain one of a number of defined or known combinations of attribute values, thereby permitting the determination of a conditional probability value using a semi-naïve Bayesian system. In at least some instances, the known combinations of attribute values may be attributable at least in part to use of repeated instances of the software, scripts, or machine-readable instructions executing on various processor-based devices as bots used to generate the fraudulent user profiles 144. Since software, scripts, or machine-readable instructions draw from a limited number of attribute values (e.g., based on preferred virtual end-user 140 characteristics specified or defined by the fraudulent end-user 130), it has been observed that specific combinations of attribute values appear in greater frequency in clusters of software, script, or machine-readable instruction generated fraudulent end-user profiles 144 than in clusters containing a greater proportion of valid end-user profiles 124. The method 800 of determining the probability that an end-user profile is a fraudulent end-user profile 144 or a suspected fraudulent end-user profile 144 using a combination of attribute values in a semi-naïve Bayesian system concludes at 806.

Figure 9:
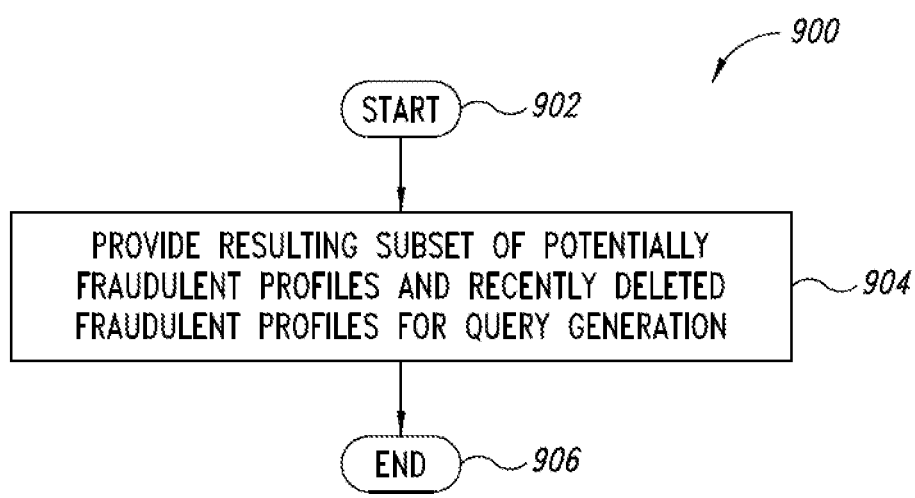
FIG. 9 is a flow diagram showing a low-level method of generating one or more compound queries that include two or more simple queries developed using known or suspected fraudulent or otherwise undesirable end-user attributes and attribute values as machine learning training examples, according to one illustrated embodiment.

FIG. 9 shows a low-level method 900 of communicating end-user attribute and attribute value data logically associated with determined fraudulent end-user profiles 144 and/or determined suspected fraudulent end-user profiles 144 detected using the naïve or semi-naïve Bayesian systems of methods 700 or 800 as training examples for query generation, according to one illustrated embodiment. The low level method 900 of communicating determined fraudulent end-user profiles 144 and/or determined suspected fraudulent end-user profiles 144 detected using the naïve or semi-naïve Bayesian systems of methods 700 or 800 as training examples for query generation may be employed as part of, or in addition to, the high level method 400 (FIG. 4). The method 900 of communicating determined fraudulent end-user profiles 144 and/or determined suspected fraudulent end-user profiles 144 detected using the naïve or semi-naïve Bayesian systems of methods 700 or 800 as training examples for query generation commences at 902.

At 904, the fraud detection system 104 communicates end-user attribute and attribute value data to the query generation sub-system for use as training examples for query generation. By providing training examples of known fraudulent end-user profiles 144 and suspected fraudulent end-user profiles 144 to the query generation sub-system, the accuracy of the queries produced by the query generation sub-system is advantageously improved.

Advantageously, since the determination of a value indicative of a conditional probability that a respective end-user profile is fraudulent as determined using equations (5) and (6) above may be performed repeatedly and is quickly updated based on end-user attribute and attribute value data supplied to the matching service entity 102, the query generation sub-system receives end-user attribute and attribute value data logically associated with and indicative of known and suspected fraudulent end-user profiles 144 on a real-time or near-real time basis. Such permits the query generation sub-system to produce queries that are able to accurately identify fraudulent or suspected fraudulent end-user profiles 144 and are also able to advantageously adapt to changes in attribute values or combinations of attribute values logically associated with fraudulent and suspected fraudulent end-user profiles 144. The method 900 of communicating determined fraudulent end-user profiles 144 and/or determined suspected fraudulent end-user profiles 144 detected using the naïve or semi-naïve Bayesian systems of methods 700 or 800 as training examples for query generation concludes at 906.

Figure 10:
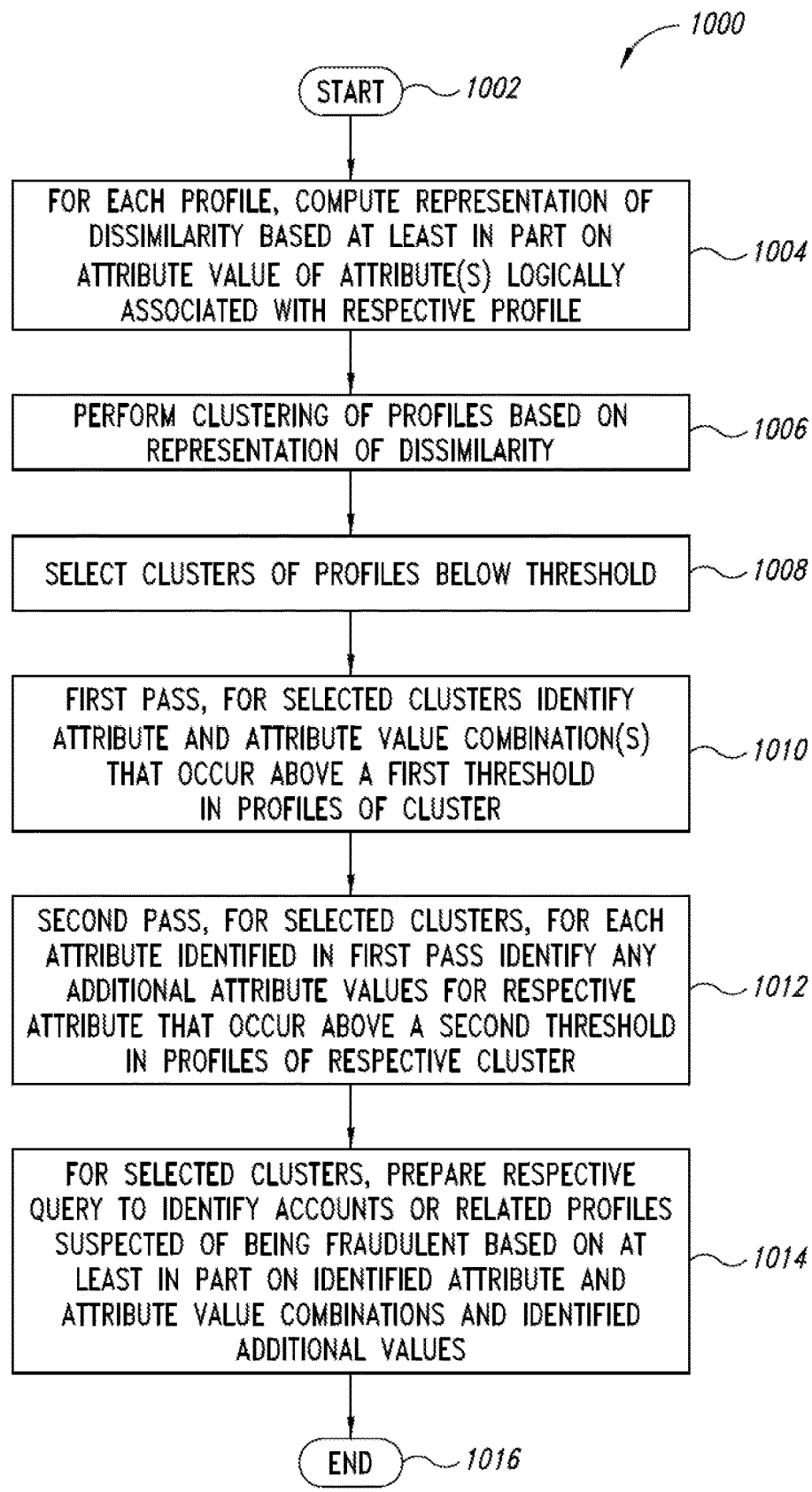
FIG. 10 is a flow diagram showing a low-level method of generating queries by using end-user profile data in a clustering analysis to detect attributes and attribute values appearing at frequencies greater than a defined threshold in known or suspected fraudulent or otherwise undesirable end-user profiles, according to one illustrated embodiment.

FIG. 10 shows a low-level method 1000 of generating one or more queries useful for identifying fraudulent and suspected fraudulent end-user profiles 144 by the fraud detection system 104, according to one illustrated embodiment. The low level query generation method 1000 may be employed as part of, or in addition to, the high level method 400 (FIG. 4). The method 1000 of generating one or more queries useful for identifying fraudulent and suspected fraudulent end-user profiles 144 by the fraud detection system 104 commences at 1002.

At 1004, the fraud detection system 104 computes data indicative of at least one representation of dissimilarity existent in a set of end-user profiles that includes any number of valid end-user profiles 124 and any number of fraudulent end-user profiles 144.

At 1006, the fraud detection system 104 clusters end-user profiles based on the at least one representation of dissimilarity determined at 1004. In at least some implementations, such clustering is performed by applying one or more clustering algorithms to a set of end-user profiles that may include new end-user profiles, existing end-user profiles, or a combination thereof to provide a set of clusters, each including at least one end-user profile. In at least some implementations, the clustering algorithm may include one or more agglomerative clustering algorithms. In at least some implementations, the clustering algorithm may include an agglomerative clustering algorithm that is based at least in part on a determined representation of dissimilarity in the set of end-user profiles 124, 144. In at least some implementations, the clustering algorithm may include an agglomerative clustering algorithm that is based at least in part on minimizing an average of dissimilarities between one determined user-profile cluster and another determined user profile cluster. In at least some implementations, the clustering algorithm may include an agglomerative clustering algorithm that is based at least in part on clustering end-user profiles based at least in part on the dissimilarity matrices of the respective end-user profiles 124, 144. In some instances, the clustering algorithm performed by the processor(s) 212 may include an agglomerative nesting clustering algorithm that clusters end-user profiles 124, 144 using at least one of: a nearest neighbor method, a furthest neighbor method, a pair group average method, a centroid method, a median method, and Ward's method. In some instances, the clustering algorithm performed by the processor(s) 212 may include a divisive analysis clustering of end-user profiles 124, 144. In some instances, the clustering algorithm performed by the processor(s) 212 may include normalizing the values associated with one or more end-user attributes 126, 146 prior to performing the cluster analysis.

At 1008, the fraud detection system 104 selects one or more end-user profile clusters for additional investigation. Any defined cluster selection criterion, process, or algorithm may be applied by the fraud detection system 104 to select the one or more end-user profile clusters. In at least some implementations, the clustering performed by the fraud detection system 104 at 1006 generates a dendrogram such as the illustrative dendrogram 300 depicted in FIG. 3.

The fraud detection system 104 autonomously or semi-autonomously selects various clusters resulting from the clustering algorithm that are suspected of including a number of fraudulent end-user profiles 144. For example, again referring to the dendrogram 300 depicted in FIG. 3, in at least some implementations, the processor(s) 212 can select a horizontal "cut" across the dendrogram 300. In some instances, some or all of the end-user profile clusters falling below the "cut" line on the dendrogram are selected for further investigation. Cluster generation and selection algorithms other than the dendrogram discussed in detail above may be substituted.

At 1010, the fraud detection system 104 makes a first pass through each end-user profile cluster selected at 1008 to identify respective end-user attributes and attribute values and/or combinations of end-user attributes and attribute values appearing within the respective end-user profile cluster at a frequency exceeding a first defined threshold. In recognition of the similarity existed between processor generated fraudulent end-user profiles 144, end-user attributes and attribute values and/or combinations of end-user attributes and attribute values appearing within the respective end-user profile cluster at a frequency above a first defined threshold (e.g., greater than "x" percent of the population of the respective cluster) are flagged or otherwise identified as indicative of the existence of a fraudulent end-user profile 144.

The fraud detection system 104 may employ one or more algorithms to perform, at least in part, the depth-first search for end-user attributes and attribute values and/or combinations of end-user attributes and attribute values that occur with a frequency exceeding the first defined threshold (i.e., the "support threshold") in the subset of end-user profiles included in each of the clusters selected at 1008. The fraud detection system 104 may perform such a depth-first search for frequent end-user attributes and attribute values and/or combinations of end-user attributes and attribute values that occur with a frequency exceeding the first defined threshold can include at least one of: an Eclat algorithm, an Apriori algorithm, an FP-growth algorithm, a GUHA Procedure ASSOC, or an OPUS search.

By way of illustrative example, for the end-user attribute "end-user processor-based device operating system" a cluster including 100 end-user profiles may have the following attribute value distribution: OS/X Version 8=62%; OS/X Version 7.5=33%; other Unix based O/S=5%. If the support threshold were set at 60% (i.e., an end-user attribute value appearing in more than 60% of the end-user profiles included in the respective cluster) the processor would flag the end-user attribute of "end-user processor-based device operating system" and the end-user attribute value of "OS/X Version 8" as indicative of a suspected fraudulent end-user profile 144.

At 1012, using the attributes or combinations of attributes identified as exceeding the first threshold (i.e., the "support threshold") at 1010, the fraud detection system 104 makes a second pass through the cluster identified as including the attributes or combinations of attributes identified as exceeding the first threshold. During the second pass, the fraud detection system 104 identifies additional end-user attributes and attribute values and/or combinations of end-user attributes and attribute values occurring with a frequency above a second defined threshold in the respective end-user profile cluster. In at least some implementations, end-user attributes and attribute values and/or combinations of end-user attributes and attribute values occurring within the respective end-user cluster at a frequency above a second defined threshold (e.g., greater than "y" percent of the population of the respective cluster) are flagged or otherwise identified as indicative of the potential existence of a fraudulent end-user profile 144.

In at least some implementations, the fraud detection system 104 uses an algorithm to perform, at least in part, the search for end-user attributes and attribute values and/or combinations of end-user attributes and attribute values that occur with a frequency exceeding the second defined threshold (i.e., the "combine threshold") in the subset of end-user profiles included in each of the clusters selected at 1008.

Again by way of illustrative example as using the same data as above, the end-user attribute "end-user processor-based device operating system" was identified in the first pass as an attribute relevant to identifying fraudulent end-users 140. Specifically, an attribute value of "OS/X Version 8" was identified as indicative of a potentially fraudulent end-user profile 144. Assuming a second threshold of 30% (i.e., a "combine threshold" equal to 30%), in the second pass, the fraud detection system 104 would further identify the attribute value "OS/X Version 7.5" (included in 33% of the end-user profiles included in the respective end-user profile cluster) as indicative of a suspected fraudulent end-user profile 144. Thus, after completing the second pass, the fraud detection system 104 would identify end-user profiles that include an end-user attribute value of either "OS/X Version 8" or "OS/X Version 7.5" associated with the end-user attribute "end-user processor-based device operating system" as indicative of a suspected fraudulent end-user profile 144.

At 1014, the fraud detection system 104 prepares one or more simple or compound queries to identify known or suspected fraudulent end-user profiles 144 based at least in part on the end-user attribute and attribute values and/or combinations of end-user attributes and attribute values identified in the first pass analysis at 1010. Optionally, the fraud detection system 104 prepares one or more simple or compound queries to identify known or suspected fraudulent end-user profiles 144 based at least in part on the end-user attribute and attribute values and/or combinations of end-user attributes and attribute values identified in the second pass analysis at 1012.

Continuing with the illustrative example developed in detail above, a first illustrative query to detect a suspected fraudulent end-user profile 144 may include querying the end-user profile using the pseudocode query "end-user processor-based device operating system=OS/X Version 8 or OS/X Version 7.5." An affirmative response to the query may indicate the end-user profile being queried is a fraudulent end-user profile 144.

In at least some instances, the fraud detection system 104 may identify a second end-user attribute and attribute value as exceeding the defined first-pass threshold value. In such an instance, the fraud detection system 104 may generate a compound query (i.e., a query composed of two or more individual attributes and respective attribute values) to detect whether an end-user profile is a suspected fraudulent end-user profile 144.

Continuing with the illustrative example developed in detail above, during the first pass, the fraud detection system may also identify the attribute value "Richmond, VA" associated with the end-user attribute of "end-user location" as appearing with a frequency greater than a first defined threshold. In such an instance, the fraud detection system may combine the attribute and attribute values identified in the first and second passes to provide a compound query. An illustrative compound query to detect a suspected fraudulent end-user profile 144 may include querying the end-user profile using the pseudocode query "end-user processor-based device operating system=OS/X Version 8 OR OS/X Version 7.5 AND end-user location=Richmond, VA." An affirmative response to the query may indicate the end-user profile being queried is a fraudulent end-user profile 144. The method 1000 of generating one or more queries useful for identifying fraudulent and suspected fraudulent end-user profiles 144 by the fraud detection system 104 concludes at 1016.

Figure 11:
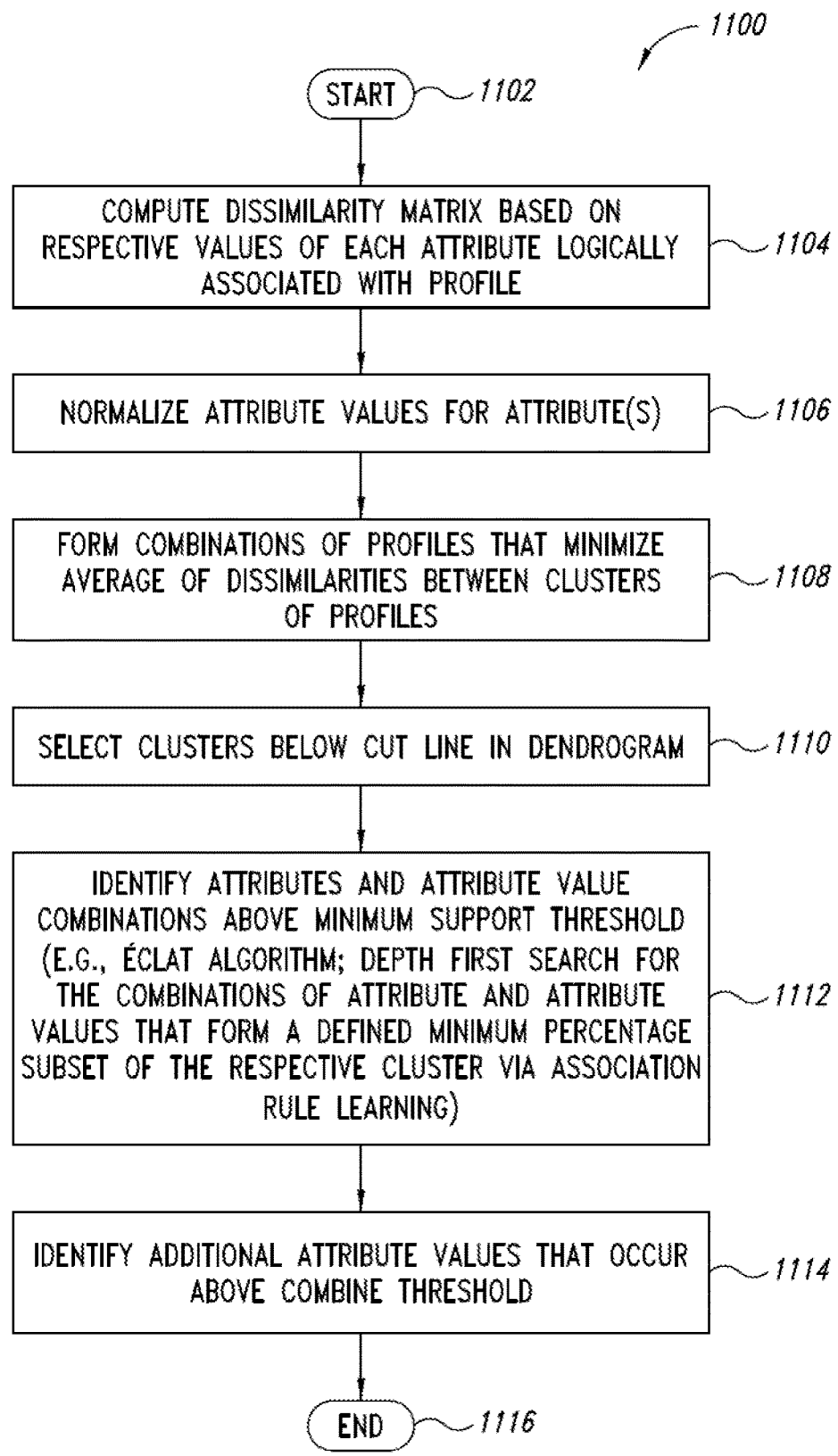
FIG. 11 is a flow diagram showing a low-level method of identifying attributes and attribute values characteristic of suspected fraudulent or otherwise undesirable end-user profiles by using end-user profile data in a clustering analysis to detect those attributes and attribute values appearing at frequencies greater than a defined threshold in known or suspected fraudulent or otherwise undesirable end-user profiles, according to one illustrated embodiment.

FIG. 11 shows a low-level method 1100 of generating one or more queries useful for identifying fraudulent and suspected fraudulent end-user profiles 144 by the fraud detection system 104, according to one illustrated embodiment. The low level query generation method 1100 may be employed as part of, or in addition to, the high level method 400 (FIG. 4). The method 1100 of generating one or more queries useful for identifying fraudulent and suspected fraudulent end-user profiles 144 by the fraud detection system 104 commences at 1102.

At 1104, the fraud detection system 104 computes a dissimilarity matrix reflecting the degree of dissimilarity existent in the attributes and attribute values and/or combinations of end-user attributes and attribute values for each end-user profile included in a set of end-user profiles. The set of end-user profiles can be of any size and can contain data logically associated with any number of fraudulent end-users 130.

At 1106, the fraud detection system 104 normalizes the attribute values for each of the attributes included in the end-user profiles.

At 1108, the fraud detection system 104 applies at least one clustering algorithm to cluster end-user profiles in a manner that minimizes the average of dissimilarities between the end-user profiles included in each respective cluster. In at least some implementations, the fraud detection system uses the dissimilarity matrices generated at 1104 and the normalized attribute values determined at 1106 to perform at least a portion of the end-user profile clustering. In at least some implementations, the clustering algorithm may include one or more agglomerative clustering algorithms. In some implementations, the clustering algorithm may include an agglomerative clustering algorithm that is based at least in part on clustering end-user profiles based at least in part on the dissimilarity matrices of the respective end-user profiles generated at 1104.

At 1110, the fraud detection system 104 selects one or more end-user profile clusters for additional investigation using a dendrogram such as the illustrative dendrogram 300 depicted in FIG. 3 generated based on the clustering algorithm applied to the end-user profiles at 1108. The fraud detection system 104 autonomously or semi-autonomously selects various end-user profile clusters falling beneath a defined "cut" line on the dendrogram are selected for further investigation.

At 1112, the fraud detection system 104 makes a first pass through each end-user profile cluster selected at 1008 to identify respective end-user attributes and attribute values and/or combinations of end-user attributes and attribute values appearing within the respective end-user profile cluster at a frequency exceeding a first defined threshold. In recognition of the similarity existed between processor generated fraudulent end-user profiles 144, end-user attributes and attribute values and/or combinations of end-user attributes and attribute values appearing within the respective end-user profile cluster at a frequency above a first defined threshold are flagged or otherwise identified as indicative of the existence of a fraudulent end-user profile 144.

The fraud detection system 104 may employ one or more algorithms to perform, at least in part, the depth-first search for end-user attributes and attribute values and/or combinations of end-user attributes and attribute values that occur with a frequency exceeding the first defined threshold (i.e., the "support threshold") in the subset of end-user profiles included in each of the clusters selected at 1008. The fraud detection system 104 may perform such a depth-first search for frequent end-user attributes and attribute values and/or combinations of end-user attributes and attribute values that occur with a frequency exceeding the first defined threshold can include at least one of: an Eclat algorithm, an Apriori algorithm, an FP-growth algorithm, a GUHA Procedure ASSOC, or an OPUS search.

At 1114, using the attributes or combinations of attributes identified as exceeding the first threshold (i.e., the "support threshold") at 1112, the fraud detection system 104 makes a second pass through the cluster identified as including the attributes or combinations of attributes identified as exceeding the first threshold. During the second pass, the fraud detection system 104 identifies additional end-user attribute values occurring with a frequency above a second defined threshold in the respective end-user profile cluster. In at least some implementations, end-user attributes and attribute values and/or combinations of end-user attributes and attribute values occurring within the respective end-user cluster at a frequency above a second defined threshold are flagged or otherwise identified as indicative of the potential existence of a fraudulent end-user profile 144. The method 1100 of generating one or more queries useful for identifying fraudulent and suspected fraudulent end-user profiles 144 by the fraud detection system 104 concludes at 1102.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various embodiments described above can be combined to provide further embodiments. All of the commonly assigned US patent application publications, US patent applications, foreign patents, and foreign patent applications referred to in this specification and/or listed in the Application Data Sheet, including but not limited to U.S. Provisional Application No. 61/911,908, filed Dec. 4, 2013, U.S. application Ser. No. 14/561,004, filed Dec. 4, 2014, and U.S. application Ser. No. 15/782,576, filed Oct. 12, 2017, are incorporated herein by reference, in their entirety. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of detecting suspected fraudulently generated user identity profiles in an online network environment using a fraud detection system that includes at least one processor and at least one non-transitory processor-readable medium that stores processor-executable instructions, the online network environment including an attribute value for an attribute associated with the user identity profiles, and including an additional attribute value that occurs frequently in the set of profiles, the method comprising:

determining, via the at least one processor, whether the attribute value is linked to a high conditional probability based on the attribute value that a profile is fraudulently generated or undesirable;

identifying, via the at least one processor, a set of profiles likely to be fraudulently generated or undesirable based on the attribute value and the high conditional probability;

querying, using the fraud detection system having at least one processor and at least one non-transitory processor-readable medium that stores processor-executable instructions, a data store containing profile information to identify profiles suspected of being fraudulently generated based at least in part on the attribute value and the additional attribute value;

screening, using the fraud detection system having at least one processor and at least one non-transitory processor-readable medium that stores processor-executable instructions, the identified profiles suspected of being fraudulently generated or undesirable; and quarantining the identified profiles.

2. The method of claim 1, wherein determining whether the attribute value is linked to a high conditional probability of being a fraudulent or undesirable profile includes computing the initial probabilities of a profile being a fraudulent profile [p(S)] or a valid profile [p(V)].

3. The method of claim 1, wherein determining whether the attribute value is linked to a high conditional probability includes computing the value indicative of a conditional probability that the respective profile is fraudulent according to:

$$p(S \mid \{x_i\}) = \frac{p(S) \prod_i^M p(x_i \mid S)}{p(S) \prod_i^M p(x_i \mid S) + p(V) \prod_i^M p(x_i \mid V)}.$$

4. The method of claim 1, wherein the attribute value includes one or more of:
- a Hyper Text Transfer Protocol (http) referrer associated with the respective profile;
- an Internet Protocol (IP) of signup and last logins associated with the respective profile;
- one or more cookies used to track individual computers associated with the respective profile;
- one or more cookies that contain a user identifier of the most recent users to log in on using a given instance of a processor-based device; and
- IP blocks of signup and at least two most recent logins associated with the respective profile.

5. The method of claim 1, further comprising: ranking the profiles into groups.

6. The method of claim 1, further comprising: providing the designated profiles to a front end system for possible deletion.

7. A user identity profile detection system in an online network environment to detect at least one of accounts or related profiles suspected of being undesirable, the online network environment including an initial probability value based at least in part on historical profile data, and including an additional attribute value that occurs frequently in the set of profiles, the system comprising:
- at least one processor; and
- at least one non-transitory processor-readable medium that stores processor-executable instructions, wherein the at least one processor:
  - determine whether the initial probability value is linked to a value indicative of a high conditional probability based on the initial probability value that a profile is undesirable;
  - identify a set of profiles likely to be undesirable based on the initial probability value and the high conditional probability;
  - query a data store containing profile information to identify profiles suspected of being undesirable based at least in part on the initial probability value and the additional attribute value;
  - screen the identified profiles suspected of being undesirable; and
  - quarantine the identified profiles.

8. The system of claim 7, wherein the at least one processor computes a value indicative of the initial probabilities of a profiles being at least one of an undesirable-profile [p(S)] or a valid profile [p(V)].

9. The system of claim 7, wherein the at least one processor computes a value indicative of a conditional probability that the respective profile is undesirable includes computing the value indicative of a conditional probability that the respective profile is undesirable according to:

$$p(S \mid \{x_i\}) = \frac{p(S) \prod_i^M p(x_i \mid S)}{p(S) \prod_i^M p(x_i \mid S) + p(V) \prod_i^M p(x_i \mid V)}.$$

10. The system of claim 7, wherein the at least one processor ranks the profiles into groups using the high conditional probability based on the initial probability value that the profile is undesirable.

11. The system of claim 7, wherein the attribute value includes one or more of:
- a Hyper Text Transfer Protocol (http) referrer associated with the respective profile;
- an Internet Protocol (IP) of signup and last logins associated with the respective profile;
- one or more cookies used to track individual computers associated with the respective profile;
- one or more cookies that contain a user identifier of the most recent users to log in on using a given instance of a processor-based device; and
- IP blocks of signup and at least two most recent logins associated with the respective profile.

12. The system of claim 7, wherein the at least one processor generates at least one output logically associated with each profile, the at least one output indicative of at least one of the following: a deletion indicator, a clearance indicator, or a further investigation indicator.

13. A fraudulent user identity profile detection system in an online network environment to detect at least one of accounts or related profiles suspected of being fraudulently generated, the online network environment including an attribute value for an attribute associated with the user identity profiles, and including an additional attribute value that occurs frequently in the set of profiles, the system comprising:
- at least one processor; and
- at least one nontransitory processor-readable medium that stores processor-executable instructions, wherein the at least one processor:
  - determine whether the attribute value is linked to a high conditional probability based on the attribute value that a profile is fraudulently generated;
  - identify a set of profiles likely to be fraudulently generated based on the attribute value and the conditional probability;
  - query a data store containing profile information to identify profiles suspected of being fraudulently generated based at least in part on the attribute value and the additional attribute value;
  - screen the identified profiles suspected of being fraudulently generated; and
  - quarantine the identified profiles.

14. The system of claim 13, wherein the at least one processor computes a value indicative of an initial probabilities of a profiles being at least one of a fraudulent profile [p(S)] or a valid profile [p(V)].

15. The system of claim 13, wherein the at least one processor computes a value indicative of a conditional probability that the respective profile is fraudulent includes computing the value indicative of a conditional probability that the respective profile is fraudulent according to:

$$p(S \mid \{x_i\}) = \frac{p(S) \prod_i^M p(x_i \mid S)}{p(S) \prod_i^M p(x_i \mid S) + p(V) \prod_i^M p(x_i \mid V)}.$$

16. The system of claim 13, wherein the at least one processor ranks the profiles into groups using the high conditional probability based on the initial probability value that the profile is one of either fraudulent.

17. The system of claim 13, wherein the attribute value includes one or more of:
- a Hyper Text Transfer Protocol (http) referrer associated with the respective profile;
- an Internet Protocol (IP) of signup and last logins associated with the respective profile;
- one or more cookies used to track individual computers associated with the respective profile;

one or more cookies that contain a user identifier of the most recent users to log in on using a given instance of a processor-based device; and IP blocks of signup and at least two most recent logins associated with the respective profile.

18. The system of claim 13, wherein the at least one processor generates at least one output logically associated with each profile, the at least one output indicative of at least one of the following: a deletion indicator, a clearance indicator, or a further investigation indicator.

* * * * *